US006819775B2

(12) United States Patent
Amidror et al.

(10) Patent No.: US 6,819,775 B2
(45) **Date of Patent: *Nov. 16, 2004**

(54) AUTHENTICATION OF DOCUMENTS AND VALUABLE ARTICLES BY USING MOIRE INTENSITY PROFILES

(75) Inventors: Isaac Amidror, Lausanne (CH); Roger D. Hersch, Epalinges (CH)

(73) Assignee: Ecole Polytechnique Fédérale de Lausanne, Lausanne (CH)

( * ) Notice: Subject to any disclaimer, the term of this patent is extended or adjusted under 35 U.S.C. 154(b) by 506 days.

This patent is subject to a terminal disclaimer.

(21) Appl. No.: 09/902,445

(22) Filed: Jun. 11, 2001

(65) Prior Publication Data

US 2002/0012447 A1 Jan. 31, 2002

(51) Int. Cl.[7] .................................................. G06K 9/00
(52) U.S. Cl. ............................ 382/100; 380/54; 283/93
(58) Field of Search ................................ 382/100, 135, 382/137, 181, 279; 283/17, 72, 93, 94, 902; 380/54

(56) References Cited

U.S. PATENT DOCUMENTS

| | | | | |
|---|---|---|---|---|
| 5,018,767 A | | 5/1991 | Wicker | 283/67 |
| 5,275,870 A | | 1/1994 | Halope et al. | 428/199 |
| 5,396,559 A | | 3/1995 | McGrew | 380/54 |
| 5,712,731 A | | 1/1998 | Drinkwater et al. | 359/619 |
| 5,995,638 A | | 11/1999 | Amidror et al. | 382/100 |
| 6,198,545 B1 | | 3/2001 | Ostromoukhov et al. | 358/459 |
| 6,249,588 B1 | | 6/2001 | Amidror et al. | 382/100 |
| 6,390,377 B1 | * | 5/2002 | Dlugos | 235/494 |
| 2004/0001604 A1 | * | 1/2004 | Amidror | 382/100 |

FOREIGN PATENT DOCUMENTS

| | | | |
|---|---|---|---|
| GB | 1138011 A | 12/1968 | B41M/3/14 |
| GB | 2224240 A | 5/1990 | B42D/15/00 |

OTHER PUBLICATIONS

Isaac Amidror, The Theory of the Moiré Phenomenon. Kluwer Academic Publishers, 2000, Sections 10.1, 10.2 and 10.9.

U.S. patent application Ser. No. 09/477,544, Ostromoukhov et al., filed Jan. 4, 2000.

(List continued on next page.)

*Primary Examiner*—Andrew W. Johns

(57) ABSTRACT

This invention discloses new methods, security devices and apparatuses for authenticating documents and valuable articles which may be applied to any support, including transparent synthetic materials and traditional opaque materials such as paper. The invention relates to moire intensity profiles which occur in the superposition of periodic or aperiodic geometrically transformed structures. By using a specially designed basic screen and master screen, where at least the basic screen is comprised in the document, a moire intensity profile of a chosen shape becomes visible in their superposition, thereby allowing the authentication of the document. If a microlens structure is used as a master screen, the document comprising the basic screen may be printed on an opaque reflective support, thereby enabling the visualization of the moire intensity profile by reflection. Automatic document authentication is supported by an apparatus comprising a master screen, an image acquisition means such as a camera and a comparing processor whose task is to compare the acquired moire intensity profile with a reference image. Depending on the match, the document handling device connected to the comparing processor accepts or rejects the document. An important advantage of the present invention is that it can be incorporated into the standard document printing process, so that it offers high security at the same cost as standard state of the art document production.

62 Claims, 32 Drawing Sheets

OTHER PUBLICATIONS

"Fourier–based analysis and synthesis of moirés in the superposition of geometrically transformed periodic structures", by I. Amidror and R.D. Hersch; *Journal of the Optical Society of America A,* vol. 15, 1998; pp. 1100–1113.

"A Generalized Fourier–Based Method for the Analysis of 2D Moiré Envelope–Forms in Screen Superpositions", by I. Amidror; *Journal of Modern Optics*, vol. 41, No. 9, 1994; pp. 1837–1862.

"Making Money", by G. Stix; *Scientific American*, Mar. 1994; pp. 81–83.

*Digital Halftoning*, by R. Ulichney, The MIT Press, 1988; Chapter 5.

"Microlens arrays", by M. Hutley et al.; *Physics World*, Jul. 1991; pp. 27–32.

"New imaging functions of moiré by fly's eye lenses", by O. Mikami; *Japan Journal of Applied Physics*, vol. 14, No. 3, 1975; pp. 417–418.

"New image–rotation using moiré lenses", by O. Mikami; *Japan Journal of Applied Physics*, vol. 14, No. 7, 1975; pp. 1065–1066.

*Digital Image Processing*, by W. K. Pratt, Wiley–Interscience, 1991; Chapter 14.

"Artistic screening", by V. Ostromoukhov and R.D. Hersch; *SIGGRAPH Annual Conference*, 1995, pp. 219–228.

"Multi–color and artistic dithering", by V. Ostromoukhov and R. D. Hersch; *SIGGRAPH Annual Conference*, 1999, pp. 425–432.

"Application of laser technology to introduce security features on security documents in order to reduce counterfeiting", by W. Hospel; *SPIE vol. 3314*, 1998, pp. 254–259.

"Halftone patterns for arbitrary screen periodicities", by T.S. Rao and G.R. Arce; *Journal of the Opt. Soc. of America A*, vol. 5, 1988, pp. 1502–1511.

"Halftone images: spatial resolution and tone reproduction", by O. Bryngdahl; *Journal of the Opt. Soc. of America*, vol. 68, 1978, pp. 416–422.

* cited by examiner

AUTHENTICATION OF DOCUMENTS AND VALUABLE ARTICLES BY USING MOIRE INTENSITY PROFILES

This application is related to U.S. patent application Ser. No. 08/520,334 filed Aug. 28, 1995, now U.S. Pat. No. 6,249,588, granted Jun. 19, 2001, and to its continuation-in-part U.S. patent application Ser. No. 08/675,914 filed Jul. 5, 1996, now U.S. Pat. No. 5,995,638, granted Nov. 30, 1999.

BACKGROUND OF THE INVENTION

The present invention relates generally to the field of anticounterfeiting and authentication methods and devices and, more particularly, to methods, security devices and apparatuses for authentication of documents and valuable articles using the intensity profile of moire patterns.

Counterfeiting of documents such as banknotes is becoming now more than ever a serious problem, due to the availability of high-quality and low-priced color photocopiers and desk-top publishing systems (see, for example, "Making Money", by Gary Stix, Scientific American, March 1994, pp. 81–83). The same is also true for other valuable products such as CDs, DVDs, software packages, medical drugs, etc., that are often marketed in easy to falsify packages.

The present invention is concerned with providing a novel security element and authentication means offering enhanced security for banknotes, checks, credit cards, identity cards, travel documents, industrial packages or any other valuable articles, thus making them much more difficult to counterfeit.

Various sophisticated means have been introduced in prior art for counterfeit prevention and for authentication of documents or valuable articles. Some of these means are clearly visible to the naked eye and are intended for the general public, while other means are hidden and only detectable by the competent authorities, or by automatic devices. Some of the already used anti-counterfeit and authentication means include the use of special paper, special inks, watermarks, micro-letters, security threads, holograms, etc. Nevertheless, there is still an urgent need to introduce further security elements, which do not considerably increase the cost of the produced documents or goods.

Moire effects have already been used in prior art for the authentication of documents. For example, United Kingdom Pat. No. 1,138,011 (Canadian Bank Note Company) discloses a method which relates to printing on the original document special elements which, when counterfeited by means of halftone reproduction, show a moire pattern of high contrast. Similar methods are also applied to the prevention of digital photocopying or digital scanning of documents (for example, U.S. Pat. No. 5,018,767 (Wicker), or U.K. Pat. Application No. 2,224,240 A (Kenrick & Jefferson)). In all these cases, the presence of moire patterns indicates that the document in question is counterfeit. Other prior art methods, on the contrary, take advantage of the intentional generation of a moire pattern whose existence, and whose precise shape, are used as a means of authenticating the document. One known method in which a moire effect is used to make visible an image encoded on the document (as described, for example, in the section "Background" of U.S. Pat. No. 5,396,559 (McGrew)) is based on the physical presence of that image on the document as a latent image, using the technique known as "phase modulation". In this technique, a uniform line grating or a uniform random screen of dots is printed on the document, but within the pre-defined borders of the latent image on the document the same line grating (or respectively, the same random dot-screen) is printed in a different phase, or possibly in a different orientation. For a layman, the latent image thus printed on the document is hard to distinguish from its background; but when a reference transparency comprising an identical, but unmodulated, line grating (respectively, random dot-screen) is superposed on the document, thereby generating a moire effect, the latent image pre-designed on the document becomes clearly visible, since within its pre-defined borders the moire effect appears in a different phase than in the background. However, this previously known method has the major flaw of being simple to simulate, since the form of the latent image is physically present on the document and only filled by a different texture. The existence of such a latent image on the document will not escape the eye of a skilled person, and moreover, its imitation by filling the form by a texture of lines (or dots) in an inversed (or different) phase can easily be carried out by anyone skilled in the graphics arts.

Other moire based methods, in which the presence of moire intensity profiles indicates the authenticity of the document, have been disclosed by the present inventors in U.S. Pat. No. 6,249,588 and its continuation-in-part U.S. Pat. No. 5,995,638. These methods completely differ from the above mentioned technique, since no phase modulation is used, and furthermore, no latent image is present on the document. On the contrary, all the spatial information which is made visible by the moire intensity profiles according to the inventions of the present inventors is encoded in the specially designed forms of the individual dots which constitute the dot-screens. These inventions are based on specially designed periodic structures, such as dot-screens (including variable intensity dot-screens such as those used in real, full gray level or color halftoned images), pinhole-screens, or microlens arrays, which generate in their superposition periodic moire intensity profiles of any chosen colors and shapes (letters, digits, the country emblem, etc.) whose size, location and orientation gradually vary as the superposed layers are rotated or shifted on top of each other. In U.S. Pat. No. 5,712,731 (Drinkwater et al.) another moire based method is disclosed which, unlike the above mentioned inventions, can be combined within a hologram or a kinegram, or with parallax effects due to the varying view angles of the observer. However, this last disclosure has the disadvantage of being limited only to the case where the superposed revealing structure is a microlens array and the periodic structure on the document is a constant dot-screen with identical dot-shapes throughout. Thus, in contrast to the present authors' inventions, this disclosure excludes the use of dot-screens or pinhole-screens as revealing structures, as well as the use on the document of full, real halftoned images with varying tone levels (such as portraits, landscapes, etc.), either in full gray levels or in color, that are made of halftone dots of varying sizes and shapes—which are the core of the methods disclosed by the present inventors, and which make them so difficult to falsify.

In the present invention the present inventors disclose new methods largely improving their previously disclosed methods mentioned above, which make them even more difficult to counterfeit. These new improvements make use of the theory developed in the paper "Fourier-based analysis and synthesis of moires in the superposition of geometrically transformed periodic structures" by I. Amidror and R. D. Hersch, Journal of the Optical Society of America A, Vol. 15, 1998, pp. 1100–1113 (hereinafter, "[Amidror98]"), and in the book "The Theory of the Moire Phenomenon" by I. Amidror, Kluwer, 2000 (hereinafter, "[Amidror00]"). According to this theory it is possible, by using certain mathematical rules that will be explained in detail below, to synthesize aperiodic, geometrically transformed structures which in spite of being aperiodic in themselves, still generate, when they are superposed on top of one another, periodic moire intensity profiles with clearly visible and undistorted elements, just like in the periodic cases disclosed by the present inventors in their previous U.S. Pat. No. 6,249,588 and its continuation-in-part U.S. Pat. No. 5,995,638. Furthermore, it will be disclosed here how even cases which do not yield periodic moires can still be advantageously used for anticounterfeiting and authentication of documents and valuable articles in accordance with the present invention.

It should be noted that the approach on which the present invention is based further differs from that of prior art in that it not only provides full mastering of the qualitative geometric properties of the generated moire (such as its geometric layout), but it also enables the intensity levels of the generated moire to be quantitatively determined.

SUMMARY OF THE INVENTION

The present invention relates to new methods, security devices and apparatuses for authenticating documents (such as banknotes, trust papers, securities, identification cards, passports, etc.) or other valuable articles (such as optical disks, CDs, DVDs, software packages, medical products, etc.). In order to fully understand the present invention and its advantages, it would be useful to summarize first the principles of the original methods disclosed by the present inventors in U.S. Pat. No. 6,249,588 and its continuation-in-part U.S. Pat. No. 5,995,638. These methods are based on the moire intensity profiles which are generated between two or more specially designed periodic dot-screens, at least one of which being located on the document itself. Each periodic dot-screen consists of a lattice of tiny dots, and is characterized by three parameters: its repetition frequency, its orientation, and its dot shapes. These periodic dot-screens are similar to dot-screens which are used in classical halftoning, but they have specially designed dot shapes, frequencies and orientations. When the second dot-screen (or a corresponding microlens array) is laid on top of the first dot-screen, in the case where both of them have been designed in accordance with the inventors' disclosures, there appears in the superposition a highly visible repetitive moire pattern of a predefined intensity profile shape, whose size, location and orientation gradually vary as the superposed layers are rotated or shifted on top of each other. As an example, this repetitive moire pattern may comprise any predefined letters, digits or any other preferred symbols (such as the country emblem, the currency, etc.).

In the present invention, the same inventors disclose new methods which are even more difficult to counterfeit. According to the theory developed in [Amidror98] and [Amidror00] it is possible, by using certain mathematical rules that will be explained in detail below, to synthesize aperiodic, geometrically transformed structures which in spite of being aperiodic in themselves, still generate, when they are superposed on top of one another, periodic moire intensity profiles with clearly visible and undistorted elements, just like in the periodic cases disclosed by the present inventors in their previous U.S. Pat. No. 6,249,588 and its continuation-in-part U.S. Pat. No. 5,995,638. Furthermore, it is shown in the present disclosure how even cases which do not yield periodic moires can still be advantageously used for anticounterfeiting and authentication of documents and valuable articles. In all of these new cases, each dot-screen is also characterized by a fourth parameter, in addition to the three parameters that were already mentioned above in the periodic case. This fourth parameter is the geometric transformation which has been applied to the originally periodic dot-screen in order to obtain the aperiodic, geometric transformed dot-screen in accordance with the present disclosure.

When the second dot-screen (hereinafter: "the master screen") is laid on top of the first dot-screen (hereinafter: "the basic screen"), in the case where both screens have been designed in accordance with the present disclosure, there appears in the superposition a highly visible repetitive moire pattern of a predefined intensity profile shape. For example, the repetitive moire pattern may consist of any predefined letters, digits or any other preferred symbols (such as the country emblem, the currency, etc.).

As disclosed in U.S. Pat. No. 5,275,870 (Halope et al.) it may be advantageous in the manufacture of long lasting documents or documents which must withstand highly adverse handling to replace paper by synthetic material. Transparent sheets of synthetic materials have been successfully introduced for printing banknotes (for example, Australian banknotes).

The present invention concerns new methods for authenticating documents which may be printed on various supports, including (but not limited to) such transparent synthetic materials. It should be noted that the term "documents" refers throughout the present disclosure to all possible printed articles, including (but not limited to) banknotes, passports, identity cards, credit cards, labels, optical disks, CDs, DVDs, packages of medical drugs or of any other commercial products, etc. Although the present invention may have several embodiments and variants, three embodiments of particular interest are given here by the way of example, without limiting the scope of the invention to these particular embodiments. In one embodiment of the present invention, the moire intensity profile shapes can be visualized by superposing a basic screen and a master screen which are both located on two different areas of the same document. In a second embodiment of the present invention, only the basic screen appears on the document itself, and the master screen is superposed on it by the human operator or the apparatus which visually or optically validates the authenticity of the document. In a third embodiment of this invention, the master screen is a sheet of microlenses (hereinafter: "microlens structure"). An advantage of this third embodiment is that it applies equally well to both transparent support, where the moire is observed by transmittance, and to opaque support, where the moire is observed by reflection. (The term "opaque support" as employed in the present disclosure also includes the case of transparent materials which have been made opaque by an inking process or by a photographic or any other process.)

The fact that moire effects generated between superposed dot-screens are very sensitive to any microscopic variations in the screened layers makes any document protected according to the present invention practically impossible to counterfeit, and serves as a means to distinguish easily between a real document and a falsified one.

It should be noted that the dot-screens which appear on the document itself in accordance with the present invention may be printed on the document like any screened (halftoned) image, within the standard printing process, and therefore no additional cost is incurred in the document production.

Furthermore, the dot-screens printed on the document in accordance with the present invention need not be of a constant intensity level. On the contrary, they may include dots of gradually varying sizes and shapes, and they can be incorporated (or dissimulated) within any variable intensity halftoned image on the document (such as a portrait, landscape, or any decorative motif, which may be different from the motif generated by the moire effect in the superposition). To reflect this fact, the terms "basic screen" and "master screen" used hereinafter will also include cases where the basic screens (respectively: the master screens) are not constant and represent halftoned images. As is well known in the art, the dot sizes in halftoned images determine the intensity levels in the image: larger dots give darker intensity levels, while smaller dots give brighter intensity levels.

In the present disclosure different variants of the invention are described, some of which are intended to be used by the general public (hereinafter: "overt" features), while other variants can only be detected by the competent authorities or by automatic devices (hereinafter: "covert" features). In the latter case, the information carried by the basic screen is masked using any of a variety of techniques, as described by the present inventors in U.S. Pat. No. 5,995,638. The terms "basic screen" and "master screen" as employed in the present disclosure include, therefore, both overt and covert cases.

Also described in the present disclosure is the multichromatic case, in which the dot-screens used are multichromatic, thereby generating a multichromatic moire effect.

The terms "print" and "printing" refer throughout the present disclosure to any process for transferring an image onto a support, including by means of a lithographic, photolithographic, photographic, electrophotographic or any other process (for example: engraving, etching, perforating, embossing, ink jet, dye sublimation, etc.).

The disclosures [Amidror98], [Amidror00], U.S. patent application Ser. No. 08/410,767 filed Mar. 27, 1995 (Ostromoukhov, Hersch), now U.S. Pat. No. 6,198,545, granted Mar. 6, 2001, and U.S. patent application Ser. No. 09/477,544 filed Jan. 4, 2000 (Ostromoukhov, Hersch) have certain information and content which may relate to the present invention and aid in understanding thereof.

BRIEF DESCRIPTION OF THE DRAWINGS

The invention will be further described, by way of example only, with reference to the accompanying figures, in which:

FIG 11A shows a curved dot-screen consisting of distorted "1"s, which was obtained by the nonlinear geometric transformation of Example 2 below;

FIG. 11B shows a curved dot-screen consisting of small pinholes, which has been distorted by the same nonlinear geometric transformation;

FIG. 11C shows the periodic, undistorted (1,0,−1,0) moire intensity profile generated when the two dot-screens are superposed with a small shift;

FIG. 11D shows how a rotation between the two dot-screens destroys the periodicity of the moire intensity profile;

FIG. 12A shows a curved dot-screen consisting of distorted "1" s, which was obtained by the nonlinear geometric transformation of Example 3 below;

FIG. 12B shows a curved dot-screen consisting of small pinholes, which has been distorted by the same nonlinear geometric transformation;

FIG. 12C shows the periodic, undistorted (1,0,−1,0) moire intensity profile generated when the two dot-screens are superposed with a small rotation;

FIG. 12D shows how a shift between the two dot-screens destroys the periodicity of the moire intensity profile;

FIG. 13A shows a curved dot-screen consisting of distorted "1" s, which was obtained by the nonlinear geometric transformation of Example 5 below;

FIG. 13B shows a curved dot-screen consisting of small pinholes, which has been distorted by the same nonlinear geometric transformation;

FIG. 13C shows the periodic, undistorted (1,0,−1,0) moire intensity profile generated when the two dot-screens are superposed with a small shift;

FIG. 13D shows that a rotation between the two dot-screens does not adversely affect the periodicity of the moire intensity profile;

DETAILED DESCRIPTION

Figure 1:
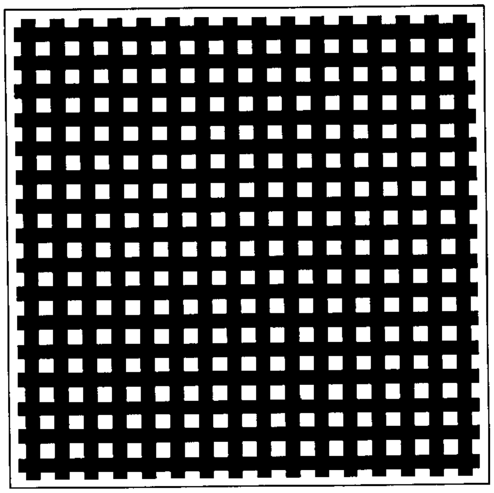
FIG. 1 shows a periodic dot-screen p(x',y') composed of square white dots on a black background.

In U.S. Pat. No. 6,249,588 and its continuation-in-part U.S. Pat. No. 5,995,638 the present inventors disclosed methods for the authentication of documents by using the intensity profile of moire patterns. These methods are based on specially designed periodic structures (dot-screens, pinhole-screens, microlens structures), which generate in their superposition periodic moire intensity profiles of any preferred colors and shapes (such as letters, digits, the country emblem, etc.) whose size, location and orientation gradually vary as the superposed layers are rotated or shifted on top of each other.

In order to add further protection and to make counterfeiting even more difficult, the present inventors come now to disclose new categories of moire based methods, in which the basic screens and/or master screens are aperiodic. As it will be explained later in this disclosure, aperiodic screens are more difficult to generate and extremely hard to reverse engineer; furthermore, they can be used as screen traps against digital photocopying or reproduction, and moreover, when printed with non-standard inks they cannot be reproduced by standard reproduction techniques. Hence they offer higher security against counterfeiting.

It is therefore an aim of the present invention to show how we can use advantageously moire effects which result from the superposition of aperiodic structures such as curvilinear gratings or geometrical transformations of periodic dot-screens. The problem is, however, that in the general case moire intensity profiles which result from the superposition of such aperiodic structures are extremely distorted, and they do not preserve the shapes of the original screen elements. However, as it will be shown below, thanks to the mathematical theory developed by the present inventors, it becomes possible by using certain mathematical rules to synthesize aperiodic geometrically transformed screens which in spite of being aperiodic in themselves, still generate when they are superposed on top of one another, moire intensity profiles with clearly visible and undistorted shapes. In a first step, it will be shown in the present disclosure that in some preferred cases the moire intensity profiles obtained in such superpositions are still periodic. In a second step, disclosed later in the present disclosure, it will be shown that particularly good results may be obtained by slightly deviating from such preferred periodic cases, thus improving their tolerance to both angular and positional mismatches in the superposition. The most general case where the moire intensity profiles obtained are completely aperiodic will be discussed last.

The new methods disclosed in the present invention make use of the mathematical theory developed in [Amidror98] and in [Amidror00]. According to this theory it is possible, by using certain mathematical rules that will be explained now in detail, to synthesize aperiodic, geometrically transformed structures which in spite of being aperiodic in themselves, still generate, when they are superposed on top of one another, periodic moire intensity profiles with clearly visible and undistorted elements throughout the superposed area, just like in the periodic cases previously disclosed by the inventors. In order to explain this, the following mathematical background must be first introduced.

Figure 2:
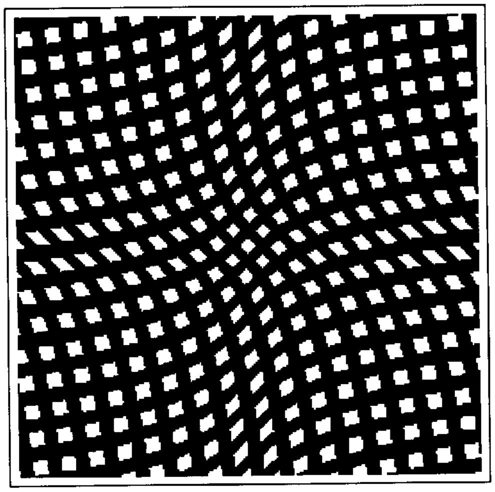
FIG. 2 shows the curved dot-screen r(x,y) that is obtained by applying on the periodic dot-screen p(x',y') of FIG. 1 the 2D non-linear transformation $g(x,y)=(-x-\text{argsinh}(y), y-\text{argsinh}(x))$.
Figure 3:
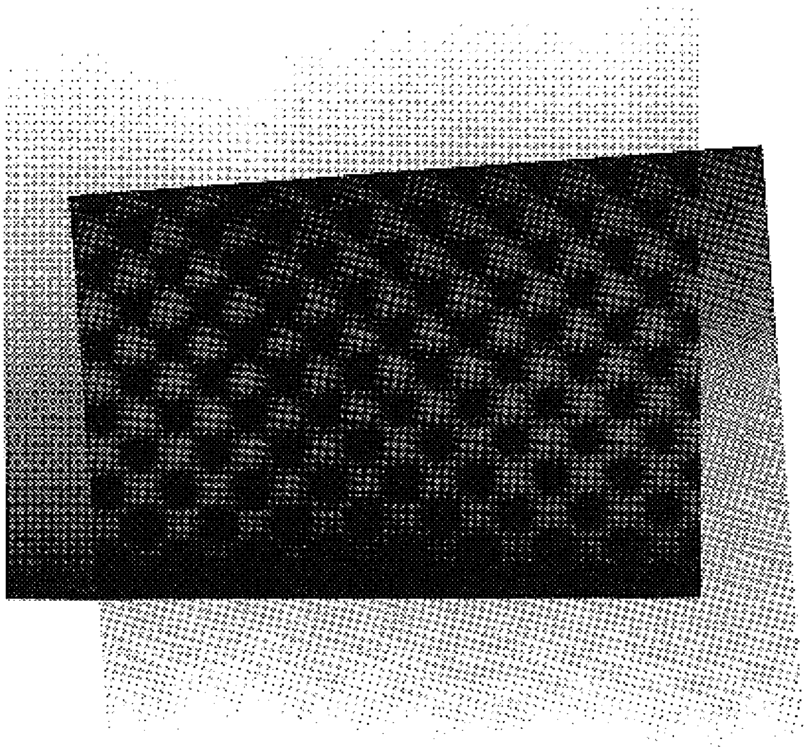
FIG. 3 shows the moire intensity profiles obtained in the superposition of two dot-screens with a constant dot frequency, the first dot-screen comprising circular black dots of varying sizes and the second dot-screen comprising triangular black dots of varying sizes.
Figure 4:
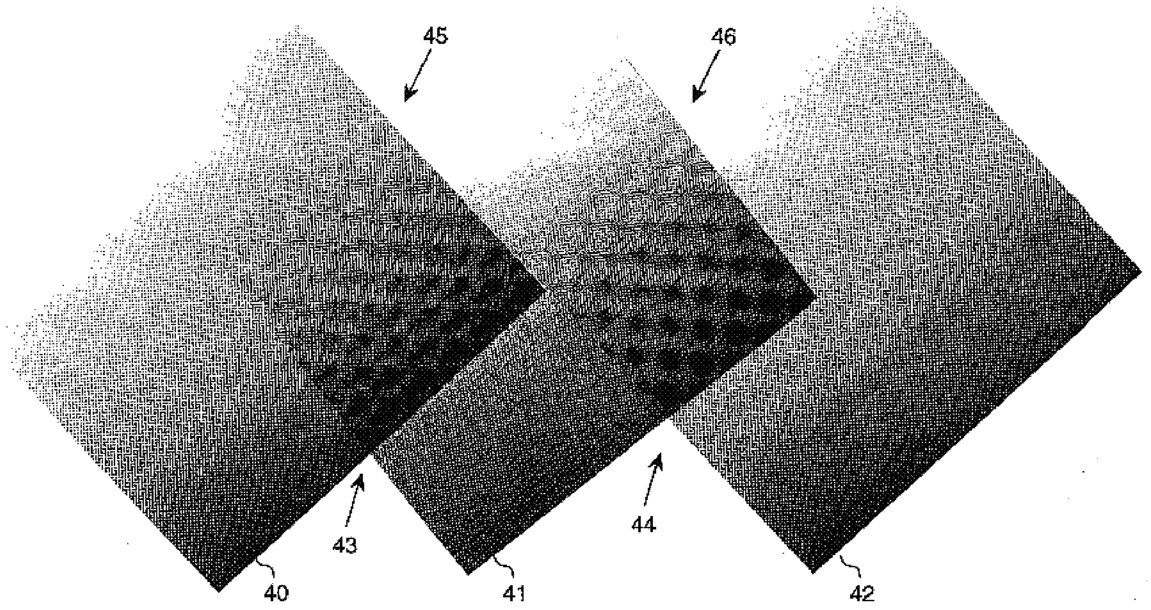
FIG. 4 shows the moire intensity profiles obtained in the superposition of three dot-screens with a constant dot frequency, two of which (40, 42) comprising circular black dots of varying sizes and one (41) comprising black dots of varying sizes having the shape of the digit "1"

Assume that the curved dot-screen r(x,y) is obtained by bending a two-fold periodic dot-screen p(x',y'), i.e. by replacing x' and y' by the functions $x'=g_1(x,y)$ and $y'=g_2(x,y)$, respectively: $r(x,y)=p(g_1(x,y),g_2(x,y))$. An example of such a curved dot-screen r(x,y) is shown in FIG. 2; the original periodic dot-screen p(x',y') is shown in FIG. 1. The intensity profile of the original, uncurved two-fold periodic screen p(x',y') is called the periodic-profile of the curved screen r(x,y). The periodic-profile of a curved screen may be any two-fold periodic wavefrom; it will be called a "normalized periodic-profile" whenever p(x',y') has a unit frequency (to both directions). The functions $x'=g_1(x,y)$ and y'=$g_2$(x,y) which bend p(x',y') into the curved screen r(x,y) are called the bending transformation. Note that x',y' are the coordinates of the original, periodic space, while x,y are the coordinates of the target, transformed space; the bending transformation can be seen, therefore, as a backward mapping from the target transformed space coordinates to the original, periodic space coordinates.

A curved screen r(x,y)=p($g_1$(x,y),$g_2$(x,y)) is therefore characterized by two basic and independent properties: its geometric layout, which is determined by the functions $g_1$(x,y) and $g_2$(x,y); and its intensity behaviour within each "curved period", which is determined by the two-fold periodic-profile p(x',y').

This bending process (change of variables) can be interpreted as a mapping of $\mathbb{R}^2$ onto itself, or equivalently, as a coordinate change in $\mathbb{R}^2$ from the original x',y' coordinate system into the x,y system. This 2D coordinate transformation is specified for each of the two original directions separately by the bending functions x'=$g_1$(x,y) and y'=$g_2$(x, y), which transform the new x,y coordinates back into the original x',y' coordinates. The effect of this 2D coordinate transformation can be expressed, then, by:

$$g:\begin{pmatrix} x \\ y \end{pmatrix} \to \begin{pmatrix} x' \\ y' \end{pmatrix} \text{ where: } \begin{pmatrix} x' \\ y' \end{pmatrix} = \begin{pmatrix} g_1(x, y) \\ g_2(x, y) \end{pmatrix}$$

or in a more compact vector notation: x'=g(x). Note that g(x) is a mapping of $\mathbb{R}^2$ onto itself: g: $\mathbb{R}^2 \to \mathbb{R}^2$ and the value it returns, g(x), is a vector. Clearly, in order that the image of this mapping span the whole x,y plane $\mathbb{R}^2$, the two individual coordinate transformations x'=$g_1$(x,y) and y'=$g_2$(x,y) must be independent, i.e. there must exist no function *f*(,) such that *f*($g_1$(x,y),$g_2$(x,y))=0 is satisfied for all (x,y). Equivalently, this means that the Jacobian:

$$J(x, y) = \begin{vmatrix} \frac{\partial g_1}{\partial x} & \frac{\partial g_1}{\partial y} \\ \frac{\partial g_2}{\partial x} & \frac{\partial g_2}{\partial y} \end{vmatrix}$$

is not identically zero. In order to avoid unnecesary mathematic complications we will generally assume that the bending transformation g(x) is a diffeomorphism on $\mathbb{R}^2$, i.e. a one-to-one continuously-differentiable mapping of $\mathbb{R}^2$ onto itself whose inverse mapping is also continuously-differentiable. This ensures that it has no abrupt jumps or other troublesome singularities.

EXAMPLE 1

Assume that we are given a periodic binary line-grid p(x',y') which is the superposition of a vertical square wave grating $$p_1(x', y') = \sum_{m=-\infty}^{\infty} rect\left(\frac{x'mT}{\tau}\right)$$

and a horizontal square wave grating $$p_2(x', y') = \sum_{n=-\infty}^{\infty} rect\left(\frac{y'nT}{\tau}\right),$$

both having the same period T and the same opening τ; that is:

$$\begin{aligned} p(x', y') &= p_1(x', y')p_2(x', y') \\ &= \sum_{m=-\infty}^{\infty}\sum_{n=-\infty}^{\infty} rect\left(\frac{x' - mT}{\tau}\right) rect\left(\frac{y' - nT}{\tau}\right). \end{aligned}$$

Note that p(x',y') can be also considered as a dot-screen composed of square white dots on a black background (see FIG. 1). We define the 2D non-linear transformation g(x,y) as follows:

$$\begin{pmatrix} x' \\ y' \end{pmatrix} = g\begin{pmatrix} x \\ y \end{pmatrix} = \begin{pmatrix} g_1(x, y) \\ g_2(x, y) \end{pmatrix} = \begin{pmatrix} -x - \text{argsinh}(y) \\ y - \text{argsinh}(x) \end{pmatrix}$$

By applying the non-linear transformation (x',y')=g(x,y) on the periodic dot-screen p(x',y') we obtain the curved dot-screen r(x,y), as shown in FIG. 2:

$$\begin{aligned} r(x, y) &= p(-x - \text{argsinh}(y),\ y - \text{argsinh}(x)) \\ &= \sum_{m=-\infty}^{\infty}\sum_{n=-\infty}^{\infty} rect\left(\frac{-x - \text{argsinh}(y) - mT}{\tau}\right) \\ &\quad rect\left(\frac{y - \text{argsinh}(x) - nT}{\tau}\right) \end{aligned}$$

The theory developed in [Amidror98] and [Amidror00] describes mathematically the moire intensity profile obtained in the superposition of geometrically transformed dot-screens. Denoting by ($k_1$,$k_2$,$k_3$,$k_4$)-moire the moire which is generated due to the ($k_1$,$k_2$)-impulse in the spectrum of the first, original uncurved dot-screen and the ($k_3$,$k_4$)-impulse in the spectrum of the second, original uncurved dot-screen, the following general result is obtained:

Result 1:

Let $r_1$(x,y) and $r_2$(x,y) be two curved dot-screens, which are obtained from two two-fold periodic dot-screens by the non-linear coordinate transformations:

$$g_1:\begin{pmatrix} x \\ y \end{pmatrix} \to \begin{pmatrix} g_1(x, y) \\ g_2(x, y) \end{pmatrix} \text{ and } g_2:\begin{pmatrix} x \\ y \end{pmatrix} \to \begin{pmatrix} g_3(x, y) \\ g_4(x, y) \end{pmatrix}$$

respectively. The ($k_1$,$k_2$,$k_3$,$k_4$)-moire $m_{k_1,k_2,k_3,k_4}$(x,y) generated in the superposition of these curved dot-screens can be seen as the result of a 3-stage process:

(1) Normalization of the original curved dot-screens by replacing in each of them ($g_i$(x,y),$g_{i+1}$(x,y)) by (x',y') (i.e. by undoing in each of them the coordinate transformation), in order to straighten them into uncurved, normalized 2D periodic dot-screens having identical periods ($T_{x'}$,$T_{y'}$)=(1,1).

(2) T-convolution of the 2D ($k_1$,$k_2$)-sub-Fourier series of the first normalized dot-screen with the 2D ($k_3$,$k_4$)-sub-Fourier series of the second normalized dot-screen. This gives the uncurved, normalized periodic-profile of the ($k_1$,$k_2$,$k_3$,$k_4$)-moire, with the same period ($T_{x'}$,$T_{y'}$)=(1,1).

(3) Bending this normalized periodic-profile of the moire into the actual curved geometric layout of the moire, by replacing (x',y') by ($k_1g_1(x,y)+k_2g_2(x,y)+k_3g_3(x,y)+k_4g_4(x,y)$, $-k_2g_1(x,y)+k_1g_2(x,y)-k_4g_3(x,y)+k_3g_4(x,y)$), i.e. by applying the non-linear coordinate transformation $$\begin{pmatrix} x' \\ y' \end{pmatrix} = \begin{pmatrix} k_1g_1(x,y)+k_2g_2(x,y)+k_3g_3(x,y)+k_4g_4(x,y) \\ -k_2g_1(x,y)+k_1g_2(x,y)-k_4g_3(x,y)+k_3g_4(x,y) \end{pmatrix} = \begin{pmatrix} k_1 & k_2 \\ -k_2 & k_1 \end{pmatrix}\begin{pmatrix} g_1(x,y) \\ g_2(x,y) \end{pmatrix} + \begin{pmatrix} k_3 & k_4 \\ -k_4 & k_3 \end{pmatrix}\begin{pmatrix} g_3(x,y) \\ g_4(x,y) \end{pmatrix}$$

or in vector form:

$$x' = K_1g_1(x)+K_2g_2(x)$$

where $K_1$ and $K_2$ denote the matrices $$\begin{pmatrix} k_1 & k_2 \\ -k_2 & k_1 \end{pmatrix} \text{ and } \begin{pmatrix} k_3 & k_4 \\ -k_4 & k_3 \end{pmatrix},$$

respectively.

It follows, therefore, that if the two original, uncurved periodic layers $p_1(x')$ and $p_2(x')$ are transformed into curved layers $r_1(x)=p_1(g_1(x))$ and $r_2(x)=p_2(g_2(x))$ by transformations $g_1(x)$ and $g_2(x)$, respectively, the periodic ($k_1,k_2,k_3,k_4$)-moiré between the original non-curved layers is transformed into a curved moire by the geometric transformation: $g_{k_1,k_2,k_3,k_4}(x)=K_1g_1(x)+K_2g_2(X)$.

Thus, the moire intensity profile in the superposition of two geometrically transformed periodic screens is a geometric transformation of the moire intensity profile formed between the original periodic screens, the geometric transformation being a weighted sum of the geometric transformations of the individual screens. (Note that this remains true even when the screens are periodic and not transformed: in this case the transformations involved simply equal the trivial transformation g(x,y)=(x,y) that maps any point into itself.)

Based on Result 1 it can be understood now under what conditions the coordinate transformation in step 3 gives a 2D periodic moire even when the original layers are curved, i.e. when the coordinate transformations gi(x,y) of the individual layers are not linear: This happens iff the coordinate transformation in step 3 is an affine transformation, namely:

$$k_1g_1(x,y)+k_2g_2(x,y)+k_3g_3(x,y)+k_4g_4(x,y)=a_1x+b_1y+c_1$$

$$-k_2g_1(x,y)+k_1g_2(x,y)-k_4g_3(x,y)+k_3g_4(x,y)=a_2x+b_2y+c_2 \quad (1)$$

In the preferred case of the (1,0,−1,0)-moire (i.e. the simplest first-order moire between two dot-screens), Result 1 is reduced into:

Result 2:

Let $r_1(x,y)$ and $r_2(x,y)$ be two curved dot-screens, which are obtained from two two-fold periodic dot-screens by the non-linear coordinate transformations:

$$g_1: \begin{pmatrix} x \\ y \end{pmatrix} \to \begin{pmatrix} g_1(x,y) \\ g_2(x,y) \end{pmatrix} \text{ and } g_2: \begin{pmatrix} x \\ y \end{pmatrix} \to \begin{pmatrix} g_3(x,y) \\ g_4(x,y) \end{pmatrix}$$

respectively. The (1,0,−1,0)-moire $m_{1,0,-1,0}(x,y)$ generated in the superposition of these curved dot-screens can be seen as the result of a 3-stage process:

(1) Normalization of the original curved dot-screens by replacing in each of them ($g_i(x,y),g_{i+1}(x,y)$) by (x',y') (i.e. by undoing in each of them the coordinate transformation), in order to straighten them into uncurved, normalized 2D periodic dot-screens having identical periods ($T_{x'},T_{y'}$)=(1,1).

(2) T-convolution of the 2D Fourier series of the first normalized dot-screen with the 2D Fourier series of the second normalized dot-screen. This gives the uncurved, normalized periodic-profile of the (1,0,−1,0)-moire, with the same period ($T_{x'},T_{y'}$)=(1,1).

(3) Bending this normalized periodic-profile of the moire into the actual curved geometric layout of the moire, by replacing (x',y') by ($g_1(x,y)-g_3(x,y)$, $g_2(x,y)-g_4(x,y)$), i.e. by applying the non-linear coordinate transformation $$\begin{pmatrix} x' \\ y' \end{pmatrix} = \begin{pmatrix} g_1(x,y)-g_3(x,y) \\ g_2(x,y)-g_4(x,y) \end{pmatrix}.$$

Note that in this case the coordinate transformation of step 3 has been reduced to:

$$\begin{pmatrix} x' \\ y' \end{pmatrix} = \begin{pmatrix} g_1(x,y)-g_3(x,y) \\ g_2(x,y)-g_4(x,y) \end{pmatrix} \quad (2)$$

It can be understood now under what conditions this coordinate transformation gives a 2D periodic moire even when the original layers are curved, i.e. when the coordinate transformations $g_i(x,y)$ of the individual layers are not linear: This happens iff the coordinate transformation (2) is an affine transformation, namely:

$$g_1(x,y)-g_3(x,y)=a_1x+b_1y+c_1$$

$$g_2(x,y)-g_4(x,y)=a_2x+b_2y+c_2 \quad (3)$$

Note that this is a simplification of condition (1) above.

EXAMPLE 2

A periodic (1,0−1,0)-moire which is generated by a lateral shift of two identical curved dot-screens on top of each other:

Let $p_1(x',y')$ be a periodic dot-screen whose period consists of the digit "1", and let $r_1(x,y)$ be the curved dot-screen obtained by applying on $p_1(x',y')$ the coordinate transformation:

$$\begin{pmatrix} x' \\ y' \end{pmatrix} = \begin{pmatrix} 2xy \\ (x^2-y^2) \end{pmatrix}$$

Figure 11A:
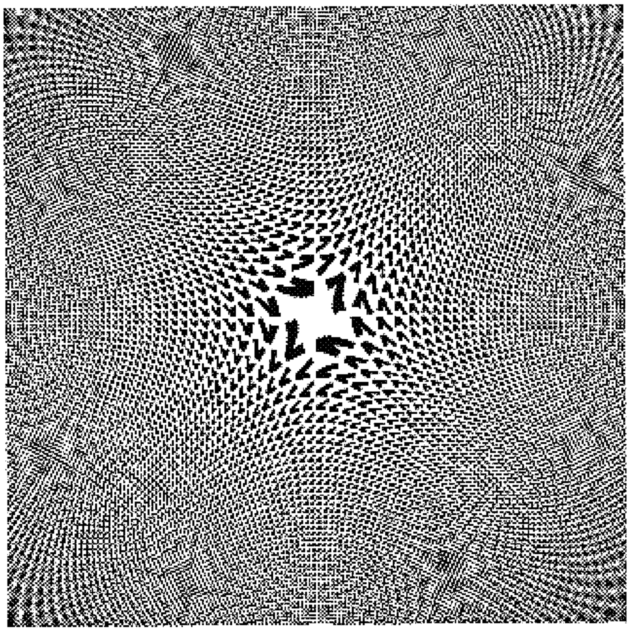
FIGS. 11A–11D show an example of two dot-screens which in spite of being aperiodic in themselves still generate in their superposition a periodic moire intensity profile with clearly visible and undistorted periods having the shape of the digit "1"

(see FIG. 11A). If we superpose on top of this curved dot-screen a second dot-screen which was subject to the same coordinate transformation, then for any lateral shift ($x_0,y_0$) between the two layers condition (3) is satisfied, i.e. we obtain an affine transformation with $a_1=2y_0$, $b_1=2x_0$, $c_1=2x_0y_0$, and $a_2=2x_0$, $b_2=-2y_0$, $c_2=(x_0-y_0)^2$:

$$\forall x_0,y_0 \; 2(x+x_0)(y+y_0)-2xy=2y_0x+2x_0y+2x_0y_0,$$

$$\forall x_0,y_0 \; [(x+x_0)^2-(y+y_0)^2]-[x^2-y^2]=2x_0x-2y_0y+(x_0-y_0)^2$$

and a two-fold periodic moire is obtained.

Figure 5A:
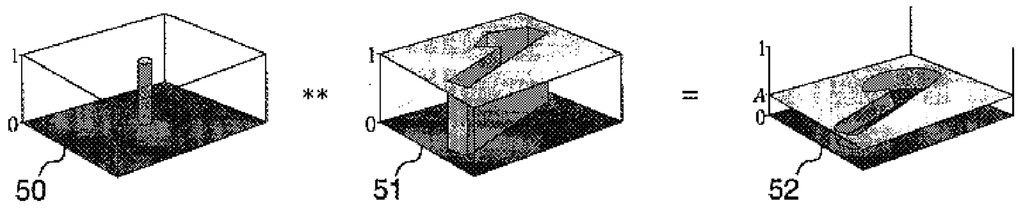
FIG. 5A illustrates how the T-convolution of tiny white dots (or holes) from one dot-screen with dots of a chosen shape from a second dot-screen gives moire intensity profiles of essentially the same chosen shape.
Figure 5B:
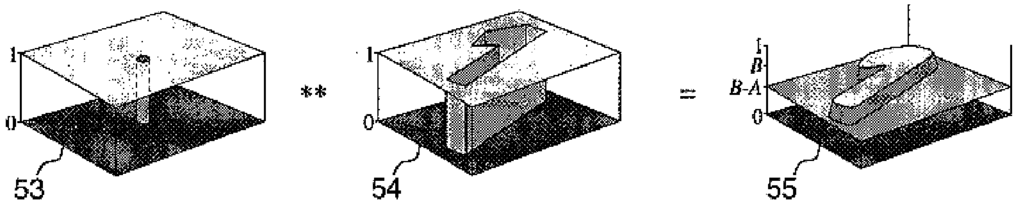
FIG. 5B illustrates how the T-convolution of tiny black dots from one dot-screen with dots of a chosen shape from a second dot-screen gives moire intensity profiles of essentially the same chosen shape, but in inverse video.
Figure 11B:
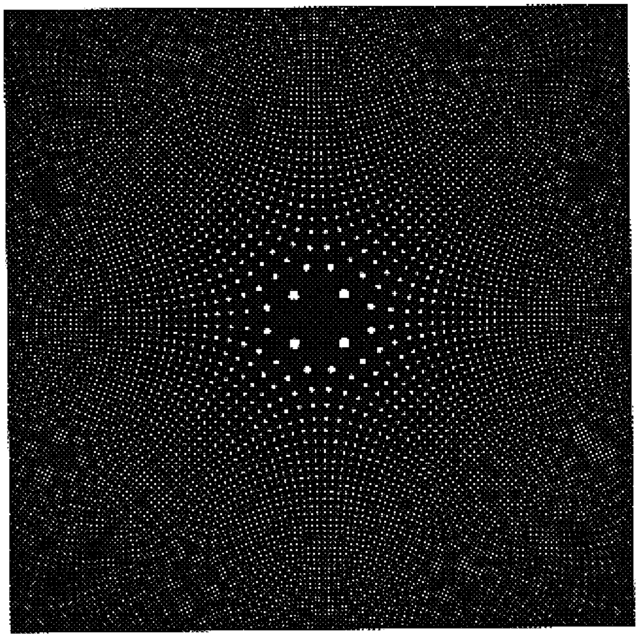
Figure 11C:
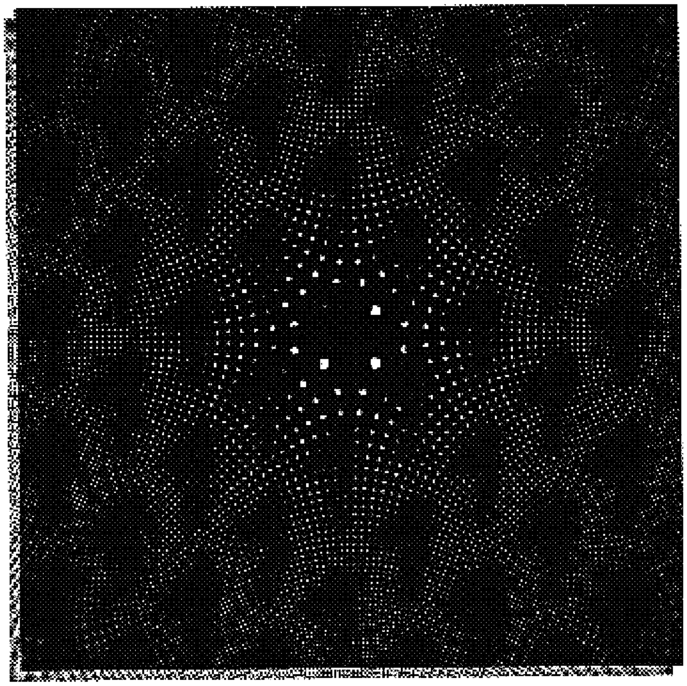

Now, if the second layer consists of small pinholes (FIG. 11B) we obtain in the superposition a periodic (1,0,−1,0)-moire whose normalized periodic-profile is, according to Result 2, a T-convolution of the shape of "1" with the pinhole, which gives again a "1"-shaped periodic-profile (see FIG. 5A). We obtain therefore a periodic (1,0,–1,0)-moire whose period consists of a magnified digit “1”, even though the two superposed screens are not periodic. This is illustrated in FIG. 11C.

Note that the (1,0–1,0)-moires obtained in this example remain periodic for any horizontal or vertical shifts between the original layers. As the shifts tend to 0, the period of the moire increases until a singular state with an infinitely large period is reached when the two layers precisely coincide. And conversely, when the layer shifts are increased, the period of the moire becomes smaller and smaller, until it finally completely disappears to the eye.

EXAMPLE 3

A periodic (1,0–1,0)-moire which is generated by rotation of two identical curved dot-screens on top of each other:

This kind of situation occurs when the bending functions $g_1(x,y)$, $g_2(x,y)$ (which are common to both layers) happen to have the following property, according to condition (3):

$$\forall\theta\ g_1(x\cos\theta+y\sin\theta,\ y\cos\theta-x\sin\theta)-g_1(x,y)=a_1x+b_1y+c_1$$

$$\forall\theta\ g_2(x\cos\theta+y\sin\theta,\ y\cos\theta-x\sin\theta)-g_2(x,y)=a_2x+b_2y+c_2$$

or equivalently, in terms of polar coordinates:

$$\forall\theta\ g_1(r,\theta)-g_1(r,0)=a_1r\cos\theta+b_1r\sin\theta+c_1$$

$$\forall\theta\ g_2(r,\theta)-g_2(r,0)=a_2r\cos\theta+b_2r\sin\theta+c_2$$

Geometrically this condition means that the difference between the surface defined by $z=g_i(x,y)$ and the surface defined by its rotated copy $g_i(x\cos\theta+y\sin\theta,\ y\cos\theta-x\sin\theta)$ gives a plane $a_ix+b_iy+c_i$, for any rotation θ.

The following functions $g_i(x,y)$ satisfy this condition:

(a) All functions of the form $g_i(x,y)=a_ix+b_iy+c_i$. In this case the difference surface is obviously a plane. However, such functions are not an interesting solution, since they do not correspond to curved screens but rather to straight, periodic screens, whose moires are periodic anyway.

(b) All the circular functions, like $g_i(x,y)=x^2+y^2$, $g_i(x,y)=e^{-(x^2+y^2)}$, etc. In this case the difference surface is the identical-zero plane, namely: the x,y plane itself. These functions are not an interesting solution, either.

Figure 12A:
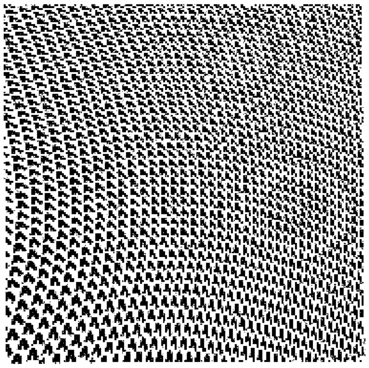
FIGS. 12A–12D show another example of two dot-screens which in spite of being aperiodic in themselves still generate in their superposition a periodic moire intensity profile with clearly visible and undistorted periods having the shape of the digit "1"
Figure 12B:
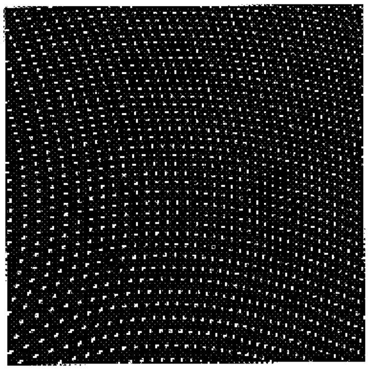
Figure 12C:
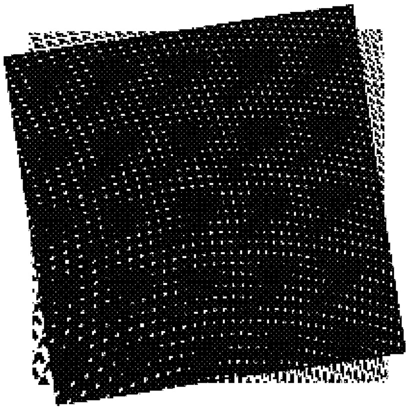

(c) The most interesting solutions can be obtained by linear combinations of functions of types (a) and (b), like: $g_i(x,y)=e^{-(x^2+y^2)}+a_ix+b_iy+c_i$, etc. In such cases the difference surface is a plane, and the curved screen $r(x,y)=p(g_1(x,y),g_2(x,y))$ has, indeed, the required property: its rotation on top of a copy of itself gives a periodic (1,0–1,0)-moire. This is illustrated in FIGS. 12A–12C for the case of $g_i(x,y)=x-e^{-(x^2+y^2)/4}$.

Note that (1,0,–1,0)-moires obtained in such cases remain periodic for any rotation θ between the original screens. The period of the moire increases as θ tends to 0°, until a singular state with an infinitely large period is reached when the two layers precisely coincide. And conversely, when θ increases the period of the moire becomes smaller, until it finally completely disappears to the eye.

The above explanations specify under what mathematical conditions geometrically transformed screens which are not periodic in themselves still generate, when they are superposed on top of one another, periodic moire intensity profiles with undistorted elements throughout the superposed area, just like in the periodic case disclosed by the present inventors in their previous U.S. Pat. No. 6,249,588 and its continuation-in-part U.S. Pat. No. 5,995,638.

Figure 11D:
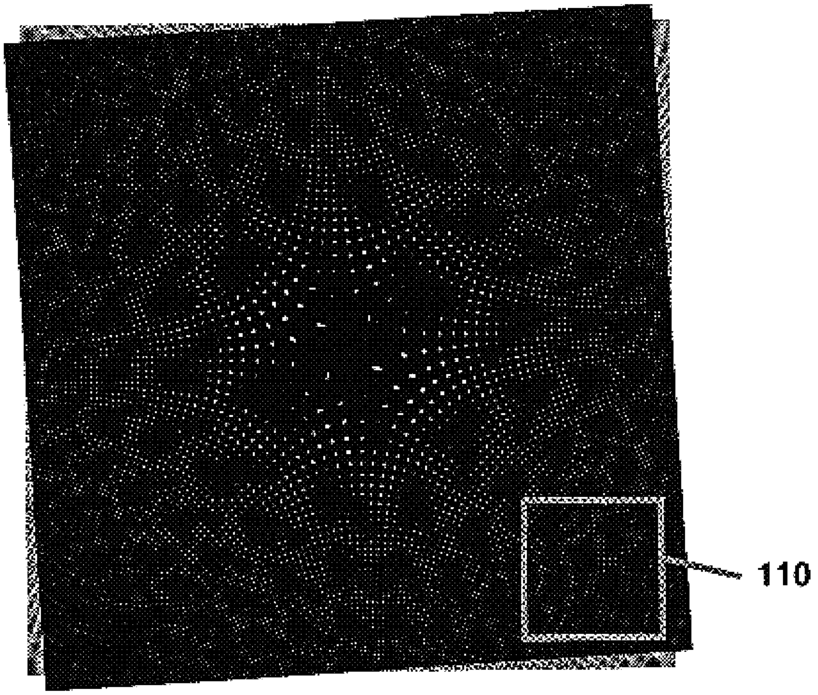
Figure 12D:
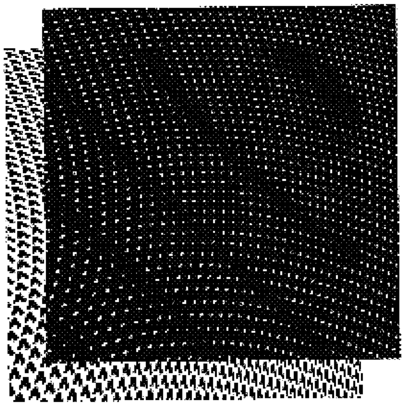

It should be noted, however, that the tolerances of such moire intensity profiles to rotations and shifts between the superposed layers are not as good as in the previously disclosed periodic case. In fact, the case of periodic layers is the only one which provides excellent tolerances to both angular and shift mismatches between the two superposed gratings. Thus, in cases like Example 2, which satisfy the conditions for a tolerance to layer shifts, any angular mismatch between the superposed layers may destroy the periodicity of the moire, as shown in FIG. 11D. And in cases like Example 3, which satisfy the conditions for a tolerance to layer rotations, any shift mismatch between the superposed layers may destroy the periodicity of the moire, as shown in FIG. 12D. In other words, the mathematical conditions that were explained above give, indeed, solutions that generate strictly periodic moires, but the price to pay for this strict periodicity is a loss in the degrees of freedom of the tolerance of these periodic moires.

Although cases with such strictly periodic moires can be used for authentication of documents, a good tolerance to both shifts and rotations, like in the original periodic cases, is still a desirable advantage for daily use by the general public. For this reason the present inventors disclose now a further improvement of the present invention, which satisfies this requirement and gives considerably better results.

The main idea in this improvement is that although the strict mathematical conditions described above give, indeed, a theoretically perfect periodicity of the obtained moires, such a perfect mathematically accurate result is not really needed in practice. A small deviation from perfect periodicity can only be detected in a large area, but within the limited boundaries of the superposed screens on the document it may hardly be visible; and furthermore, even if a small deviation from perfect periodicity is visible, it can still be tolerated if the shapes of the moire intensity profiles are clearly recognizable and only slightly distorted. The idea is, therefore, that the most useful cases would be a compromise or a tradeoff between a less perfect periodicity of the moire and an improved tolerance to angular and shift mismatches.

Since such cases do not obey a specific mathematical rule, they will be normally obtained heuristically or experimentally, by gradually improving promising cases through repeated experiments. For instance, one may start with a case obtained using the strict mathematical rules, and use only a selected part of each of the screens (not necessarily the same part in both screens) in order to eliminate screen zones that give particularly distorted moires in the superposition when the layers are shifted or rotated.

In another possible approach, one may start with perfectly periodic screens, and gradually apply on them a non-linear transformation by slowly tuning some of the parameters of the transformation until a good optimal case is found.

It should be understood that the number of approaches for obtaining good screen combinations in accordance with the present disclosure is unlimited, and the approaches mentioned above are only given by way of example, and are by no means exhaustive.

EXAMPLE 4

An improvement of Example 2 above having good tolerances to both shifts and rotations:

A significant improvement with respect to Example 2 above can be obtained by discarding the central part of the screens of Example 2 (see FIGS. 11A and 11B), and using only peripheral zones which are located away from the center and show a more regular behaviour. As shown in FIGS. 11C and 11D moire intensity profiles obtained in the superposition of such peripheral zones have a rather good tolerance to both shifts and rotations. An example of such a peripheral zone is shown by 110 in FIG. 11D.

EXAMPLE 5

A periodic (1,0−1,0)-moire which is generated by rotation or lateral shift of two identical curved dot-screens on top of each other:

Let $p_1(x',y')$ be a periodic dot-screen whose period consists of the digit "1", and let $r_1(x,y)$ be the curved dot-screen obtained by applying on $p_1(x',y')$ the coordinate transformation:

$$\begin{pmatrix} x' \\ y' \end{pmatrix} = \begin{pmatrix} 0.5x^2 \\ 0.5y^2 \end{pmatrix}$$

Figure 13A:
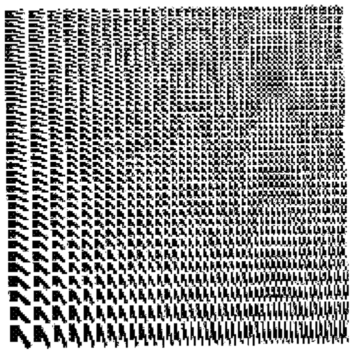
FIGS. 13A–13D show an example of two dot-screens which in spite of being aperiodic in themselves still generate in their superposition a periodic moire intensity profile with the shape of the digit "1", which has an improved tolerance to both shifts and rotations.
Figure 13B:
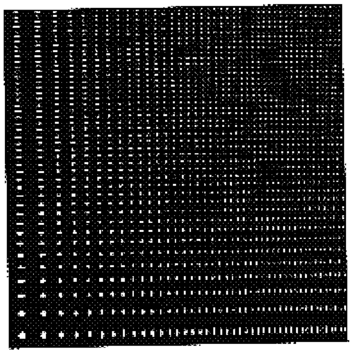

Such a curved dot-screen is illustrated in FIG. 13A. If we superpose on top of this curved dot-screen a second dot-screen consisting of small pinholes which was subject to the same coordinate transformation (see FIG. 13B), then for any lateral shift $(x_0,y_0)$ between the two layers condition (3) is satisfied, i.e. we obtain an affine transformation with $a_1=x_0$, $b_1=0$, $c_1=0.5x_0^2$, and $a_2=y_0$, $b_2=0$, $c_2=0.5y_0^2$:

$$\forall x_0\ 0.5(x+x_0)^2-0.5x^2=x_0x+0.5x_0^2,$$

$$\forall y_0\ 0.5(y+y_0)^2-0.5y^2=y_0y+0.5y_0^2,$$

Figure 13C:
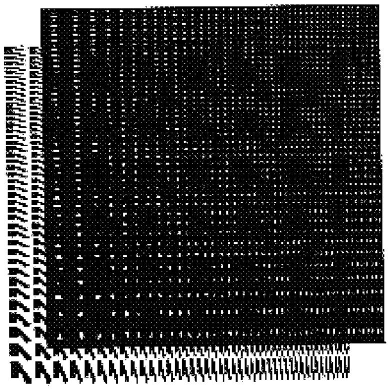
Figure 13D:
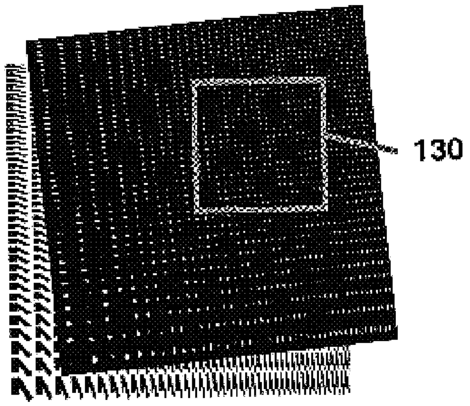

We obtain therefore a periodic (1,0,−1,0)-moire whose period consists of a magnified digit "1", even though the two superposed screens are not periodic. This is shown in FIG. 13C. However, this case does not satisfy the conditions for a tolerance to layer rotations. But if we only use a small portion from the first quadrant of each dot-screen, excluding the distorted areas at the origin and along the two axes, then the moire obtained in the screen superposition has a rather good tolerance to layer rotations, too. This is illustrated in FIG. 13D.

In the most general case of the present invention, in which the coordinate transformation of the moire intensity profiles is not affine (i.e. it does not satisfy condition (3)), the moire intensity profiles obtained are not periodic. However, even such aperiodic moire intensity profiles can still be used for anticounterfeiting and authentication purposes in accordance with the present invention. In such cases, the authentication will be based on the examination of at least one of the elements of the aperiodic moire in spite of their distortions. For example, in FIG. 11D in which the moire intensity profiles are not periodic, "1"-shaped moire profile elements can be clearly identified and used for document authentication. The protection offerred by such cases is in the fact that the moire intensity profiles are only generated in the superposition, and they do not appear in the original image which is located on the document (the basic screen) unless the master screen is superposed on top of it. Furthermore, when the master screen is slightly moved (shifted or rotated), the resulting moire elements vary dynamically throughout the original image (for example, they may be scaled, rotated, shifted, or otherwise transformed), and they are clearly distinguished from any static pattern that is printed on the document.

It should be noted that the methods disclosed in the present invention can be considered as non-linear magnifiers: in cases where the moire intensity profiles generated in the superposition of geometrically transformed layers are periodic we obtain a rectifying magnifier; and in cases where the moire intensity profiles are aperiodic we obtain a distorting magnifier.

Generation of Geometrically Transformed Dot-screens

Figure 6:
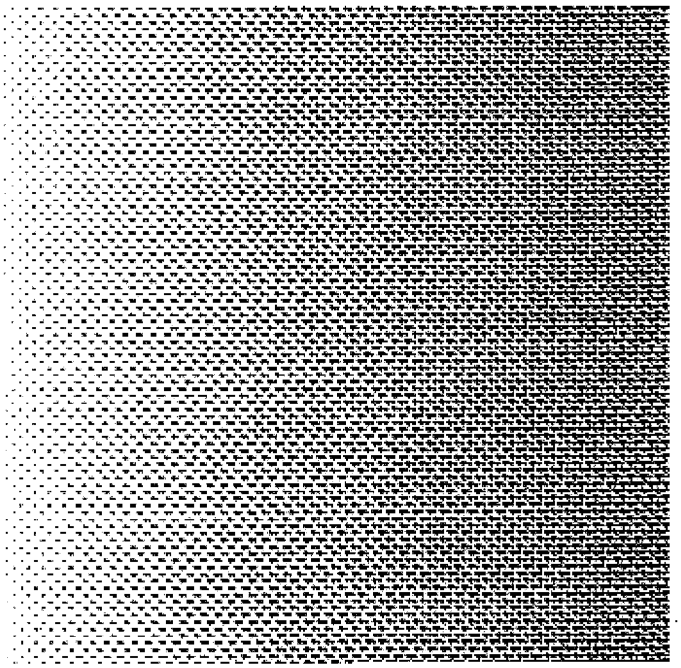
FIG. 6 shows a basic screen comprising black dots of varying sizes having the shape of the digit "1"
Figure 7A:
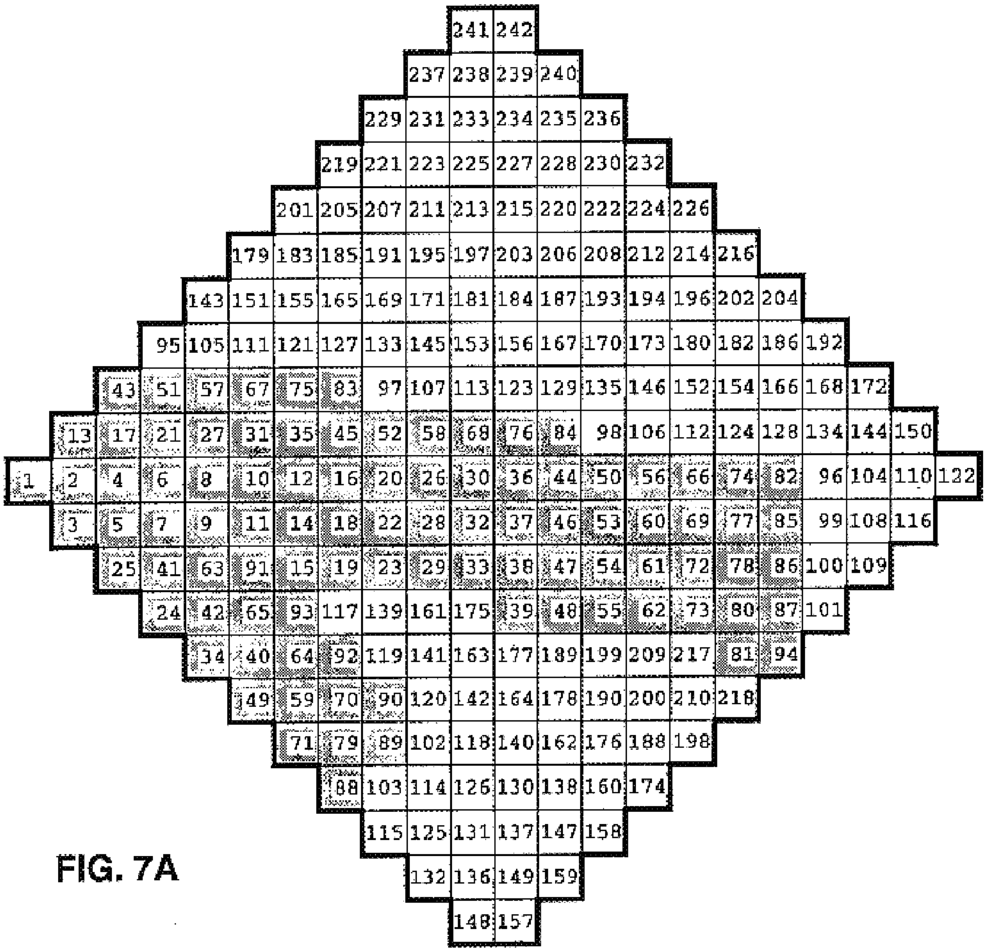
FIG. 7A shows the dither matrix used to generate the basic screen of FIG. 6.
Figure 7B:
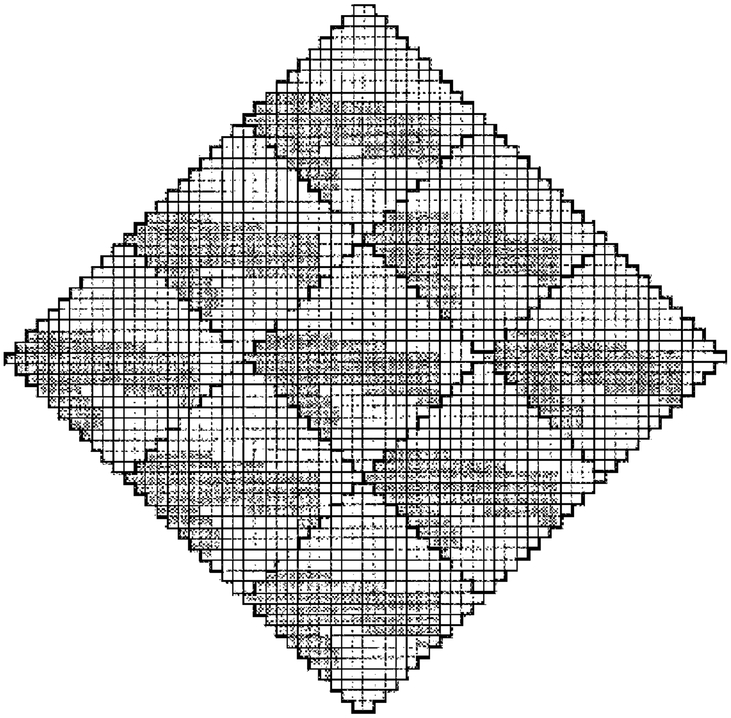
FIG. 7B is a greatly magnified view of a small portion of the basic screen of FIG. 6, showing how it is generated from the dither matrix of FIG. 7A.
Figure 16A:
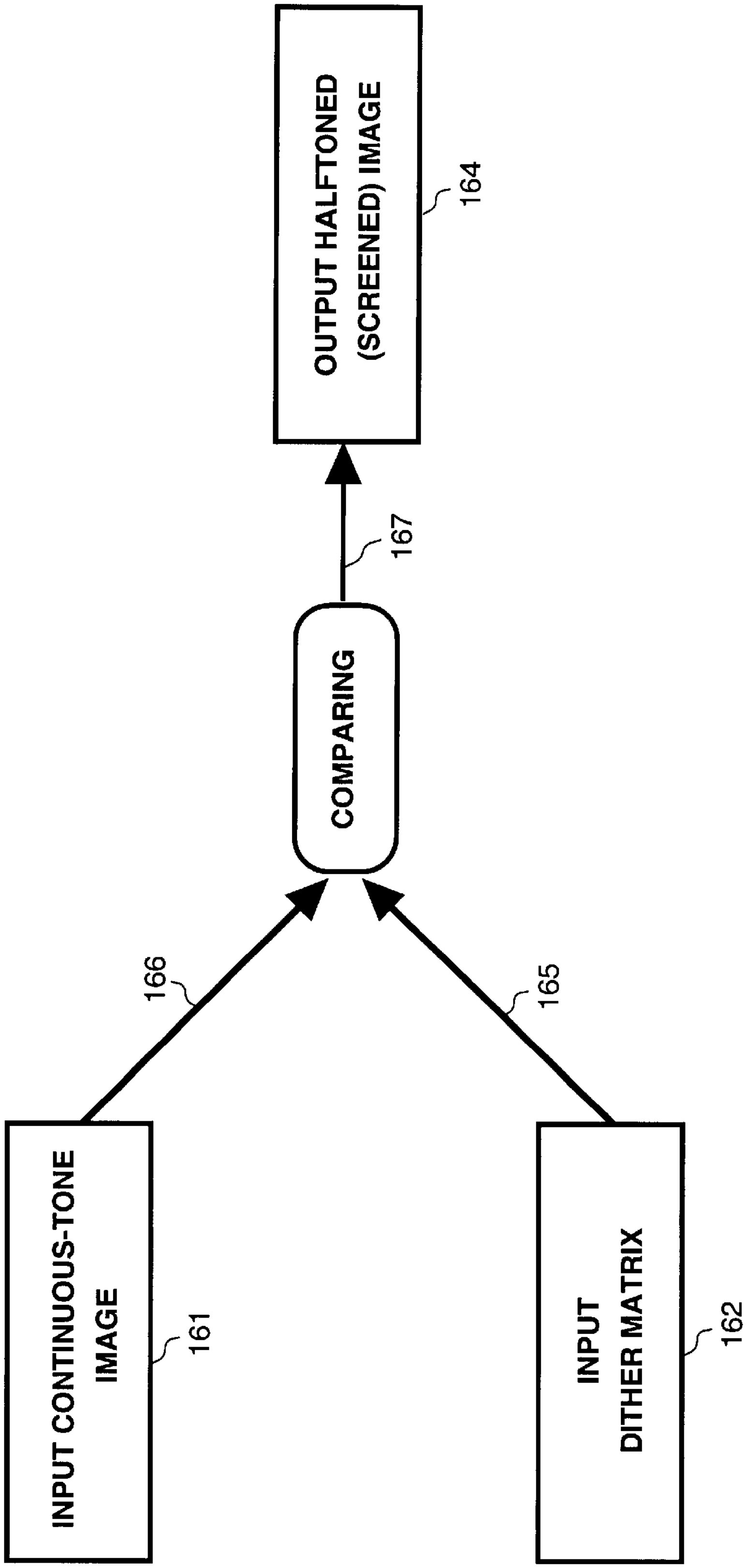
FIG. 16A shows a block diagram of the standard halftoning method by dithering (prior art)

In order to understand how geometrically transformed dot-screens can be generated, it may be helpful first to review the standard halftoning method by dithering which is well known in the prior art (see, for example, "Halftone images: spatial resolution and tone reproduction" by O. Bryngdahl, Journal of the Opt. Soc. of America, Vol. 68, 1978, pp. 416–422). This prior art method is schematically illustrated in the block diagram shown in FIG. 16A. In this method, we are given an input continuous-tone image 161, and an input dither matrix 162 which we virtually consider to be replicated periodically throughout the entire plane. The resulting halftoned (screened) image 164 will be generated in a destination bitmap whose dimensions, M×N pixels, are predetermined. The method consists of scanning the destination bitmap pixel by pixel, and for each pixel (x,y): (a) finding the corresponding location in the input continuous-tone image and its tone value T; (b) finding the corresponding location in the dither matrix and its value D; and (c) comparing the tone value T found in the continuous-tone image with the value D found in the dither matrix, and accordingly writing in the pixel (x,y) in the destination bitmap 1 (i.e. an inked pixel) if D>T or 0 (non-inked pixel) otherwise. Note that for the purpose of (b) we virtually consider the dither matrix to be periodically replicated throughout the entire plane; in practice, this is usually done without physically replicating the dither matrix, but rather by using modulo operations that cyclically wrap around any plane location backwards into the original dithering matrix (see, for example, p. 1510 in "Halftone patterns for arbitrary screen periodicities" by T. S. Rao and G. R. Arce, Journal of the Opt. Soc. of America A, Vol. 5, 1988, pp. 1502–1511). As an illustration, FIG. 7A shows the dither matrix that is used to generate the periodic basic screen with varying intensity levels shown in FIG. 6, whose screen dots have the shape of the digit "1". FIG. 7B shows a magnified view of a small portion of this basic screen, and how it is built by the dither matrix of FIG. 7A.

Figure 7C:
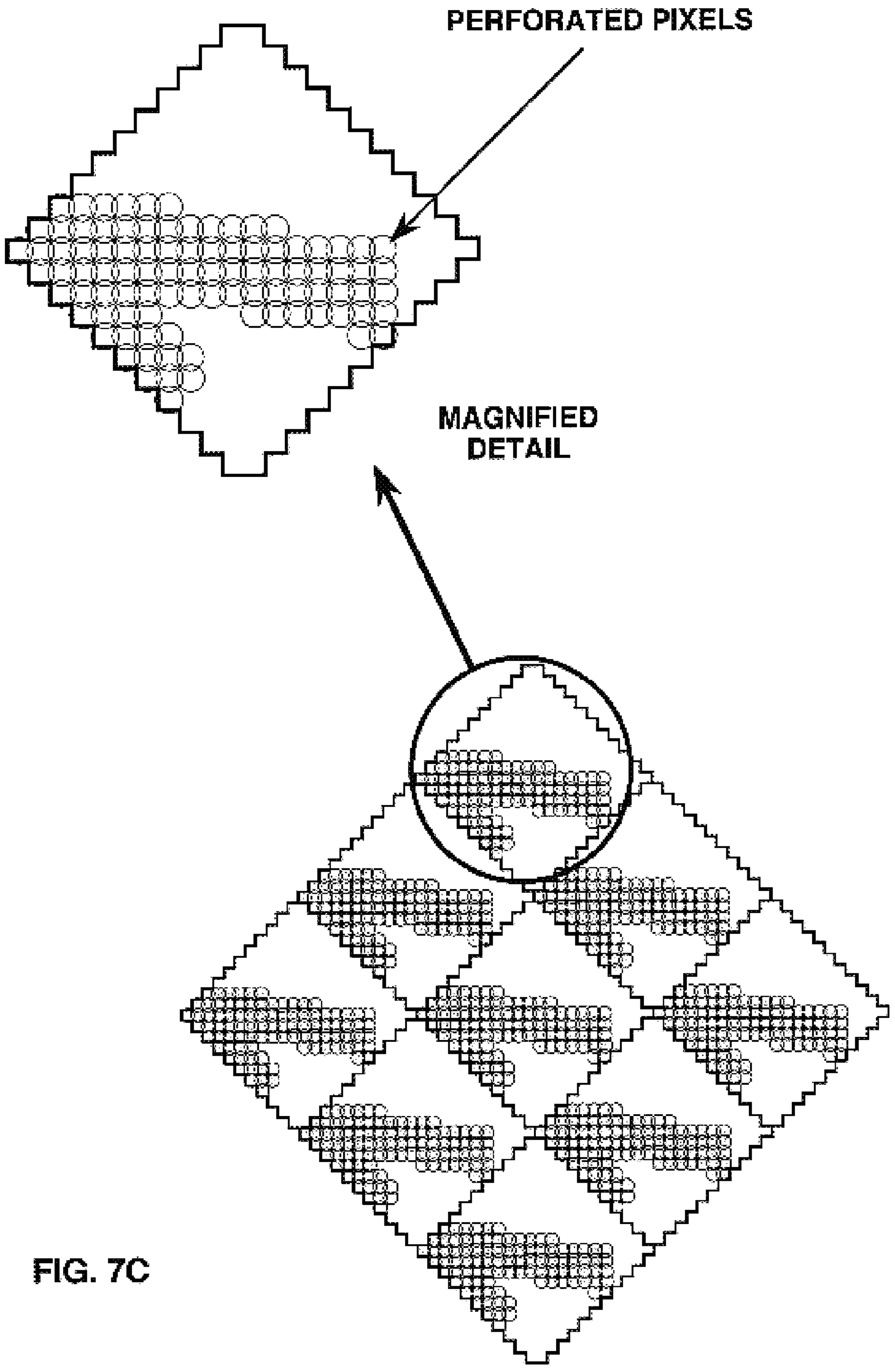
FIG. 7C is a greatly magnified view of a small portion of the basic screen of FIG. 6, showing how it can be generated from the dither matrix of FIG. 7A by microperforation.
Figure 7D:
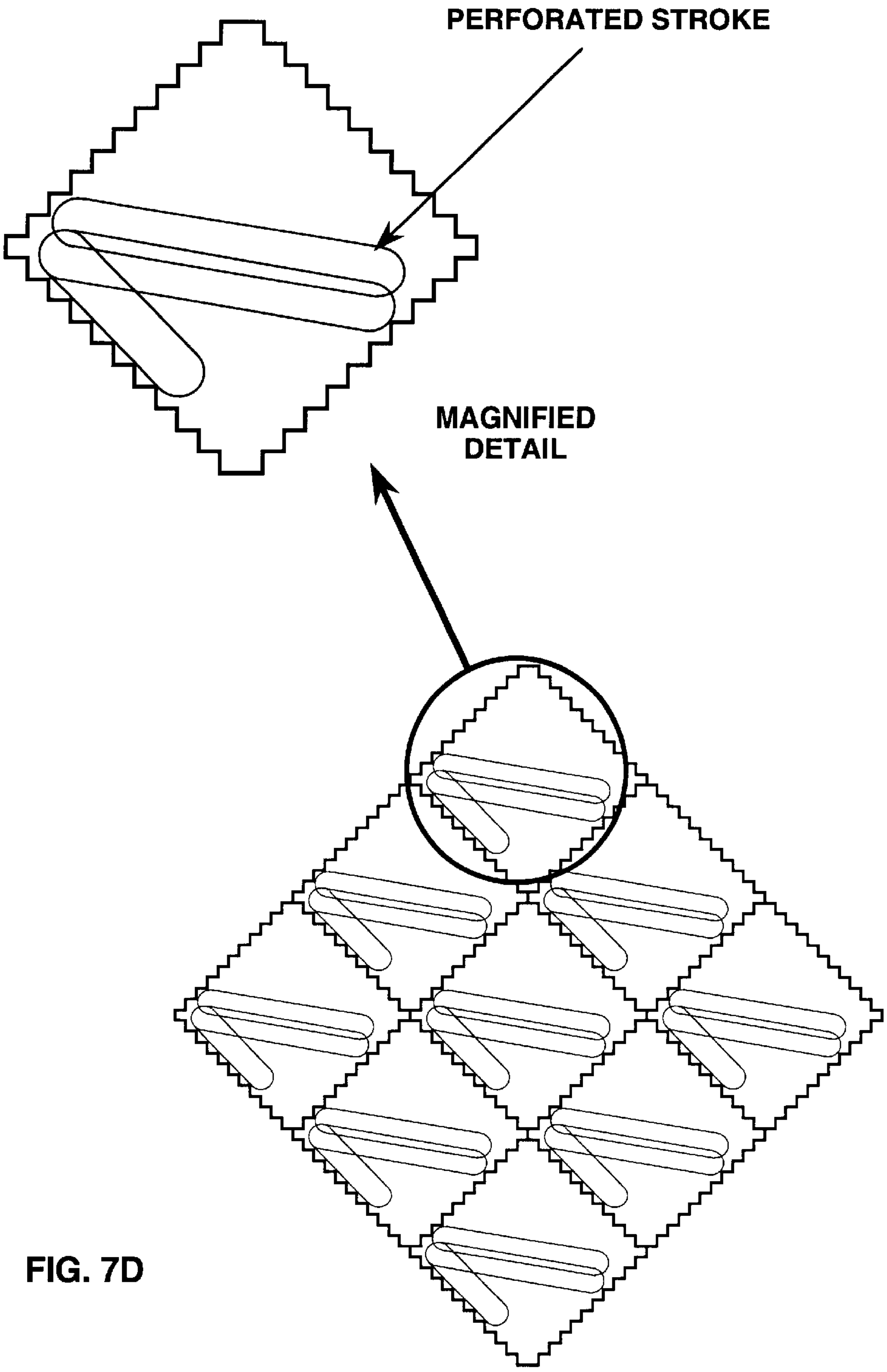
FIG. 7D shows an alternative way of generating the basic screen of FIG. 6 by microperforation.
Figure 8:
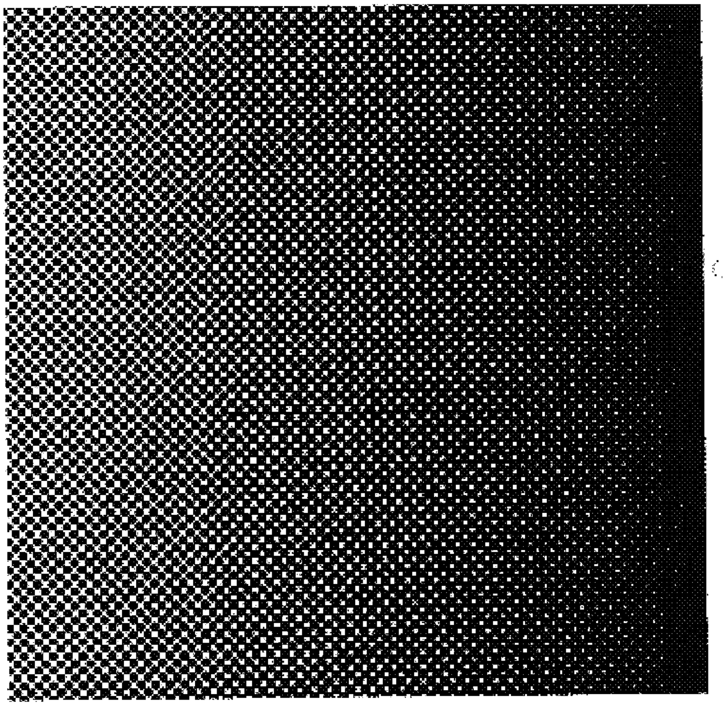
FIG. 8 shows a master screen comprising small white dots of varying sizes.

It should be noted that the dot screens (the master screen, the basic screen, or both) may be also obtained by perforation instead of by applying ink. In a typical case, a strong laser beam with a microscopic dot size (say, 50 microns or even less) scans the document pixel by pixel, while being modulated on and off, in order to perforate the substrate in predetermined pixel locations. Different laser microperforation systems for security documents have been described, for example, in "Application of laser technology to introduce security features on security documents in order to reduce counterfeiting" by W. Hospel, SPIE Vol. 3314, 1998, pp. 254–259. In cases where the dot screens are obtained by perforation rather than by applying ink, the generation of the dot screens is similar to the process described above, except that in step (c) "1" means a perforated pixel and "0" means a non perforated pixel (or, possibly, vice versa). This is illustrated in FIG. 7C, in which predetermined pixels are perforated (instead of being inked, as in the case of the corresponding FIG. 7B). It should be noted that laser microperforation systems may be also based on vector graphics instead of raster graphics; in such cases the laser beam does not scan the document pixel by pixel, line after line, but rather follows some predefined 2D trajectories (such as straight lines, arcs, etc.), just like a pen plotter, thus generating perforations of predefined forms on the document. Such systems can be equally well used for the generation of perforated dot screens, as illustrated in FIG. 7D.

In yet another category of methods, the dot screens (the master screen, the basic screen, or both) may be obtained by a complete or partial removal of the color layer at the screen dots, for example by laser or chemical etching.

Figure 16B:
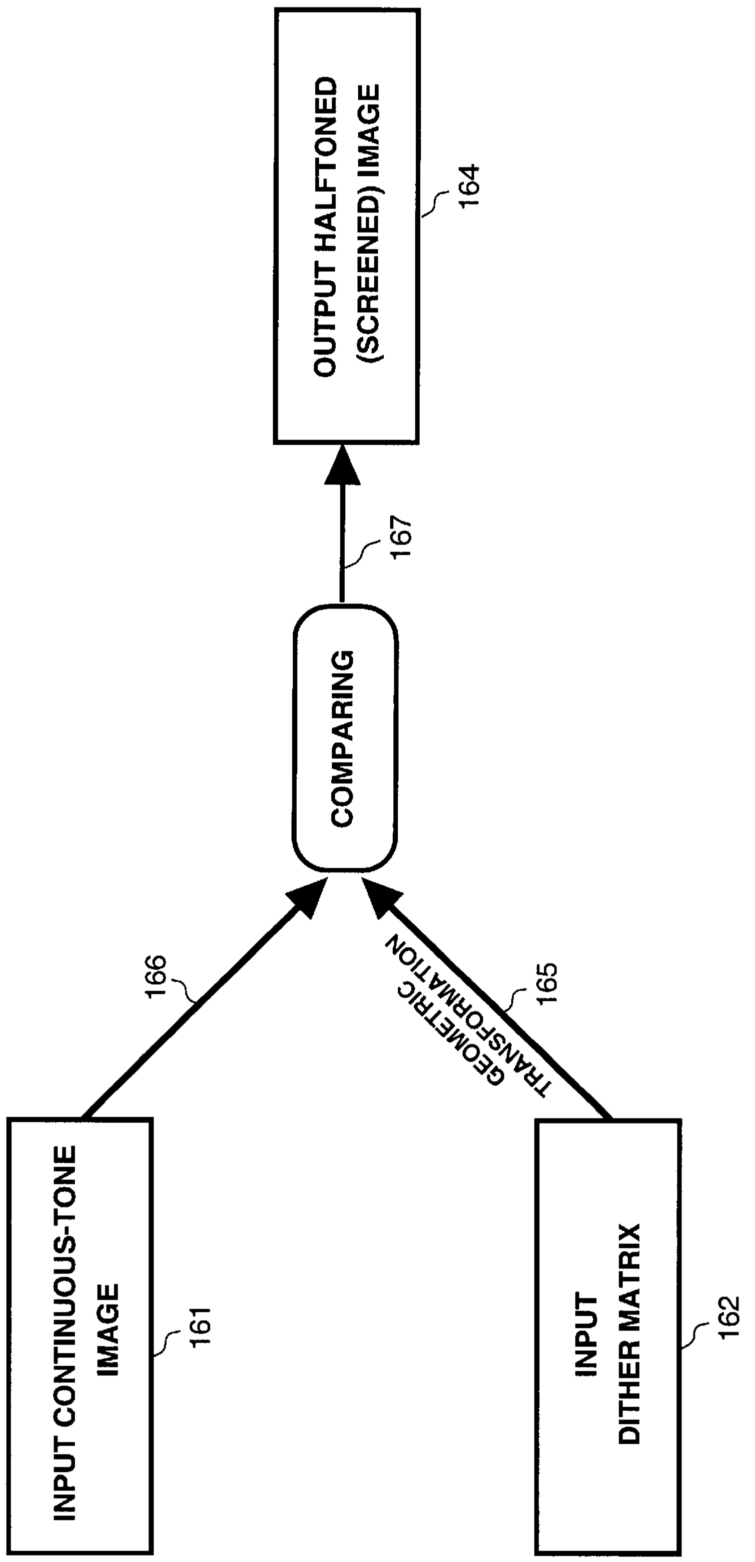
FIG. 16B shows a block diagram of a possible method for generating halftoned images having geometrically transformed dot-screens.

Now, in order to generate a halftoned image which is halftoned by a geometrically transformed dot-screen, all that we have to do is to add to the process described above the desired geometric transformation (morphing). This is illustrated in the block diagram shown in FIG. 16B. Note that in this block diagram the geometric transformation is applied at flow line 165, so that it only concerns the halftone screen, but not the original input image, which remains in itself non-transformed. (As it may be easily understood, if the geometric transformation were applied at flow line 166 instead of 165, the result would have been a transformed (morphed) image which is rendered by a non-transformed halftone screen; and if the geometric transformation were applied at flow line 167 instead of 165, the result would have been a halftoned image which is transformed together with its halftone screen).

Geometrically transformed dot-screens such as those used in the present disclosure may be therefore produced in practice in two steps. In the first step, an ordered dither matrix which defines the original, non-transformed dot shapes for all tone levels is generated, exactly as in the case of periodic dot-screens. In the second step, a dithering method as described above and illustrated in FIG. 16B is used, applying at 165 the non-linear transformation that has been selected as explained earlier in this disclosure. This way, smooth spatial variations of the screen shapes are obtained. In a preferred embodiment, the screen morphing can be done on the fly where for each pixel (x,y) of the geometrically transformed dot-screen being generated in the destination bitmap its original location (x',y')=g(x,y) in the original, uncurved screen is found, thus determining its value in the dither matrix exactly as in the standard, classical non-transformed case. In an alternative embodiment, the morphing can be done by applying the transformation to the replication of the original dither matrix throughout the entire plane, and performing a standard dithering as described above using instead of the original dither matrix the transformation of the replicated dither matrix.

Figure 9A:
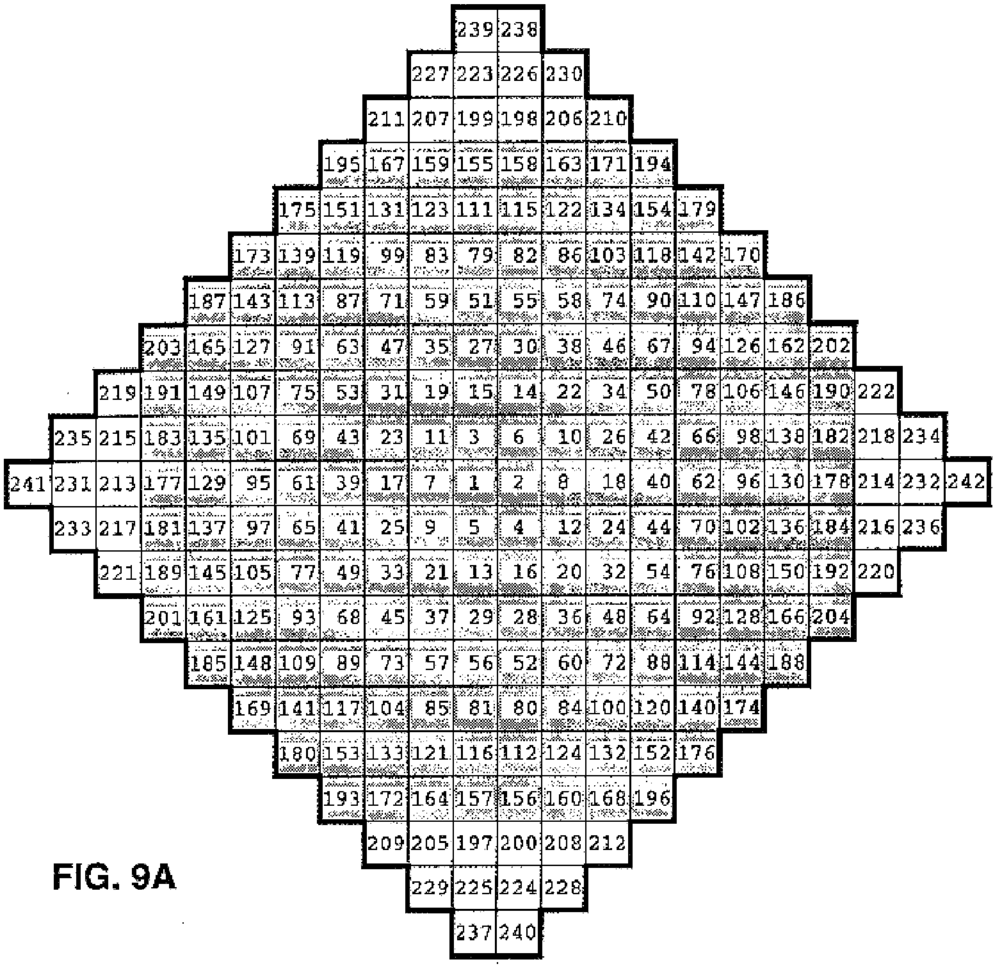
FIG. 9A shows the dither matrix used to generate the master screen of FIG. 8.
Figure 9B:
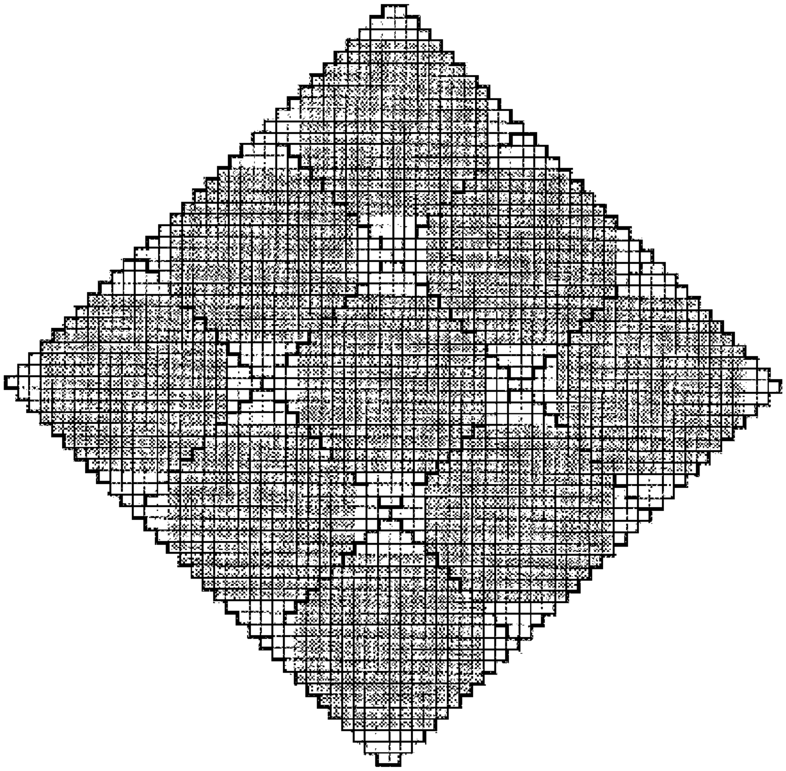
FIG. 9B is a greatly magnified view of a small portion of the master screen of FIG. 8, showing how it is generated from the dither matrix of FIG. 9A.
Figure 14:
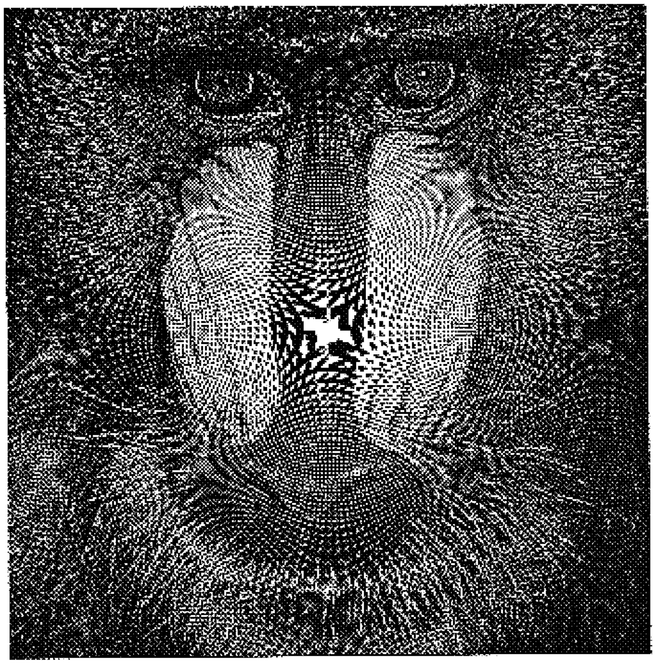
FIG. 14 shows a real halftone image which is made of the geometrically transformed dot-screen of FIG. 11A, consisting of distorted "1"s.
Figure 15:
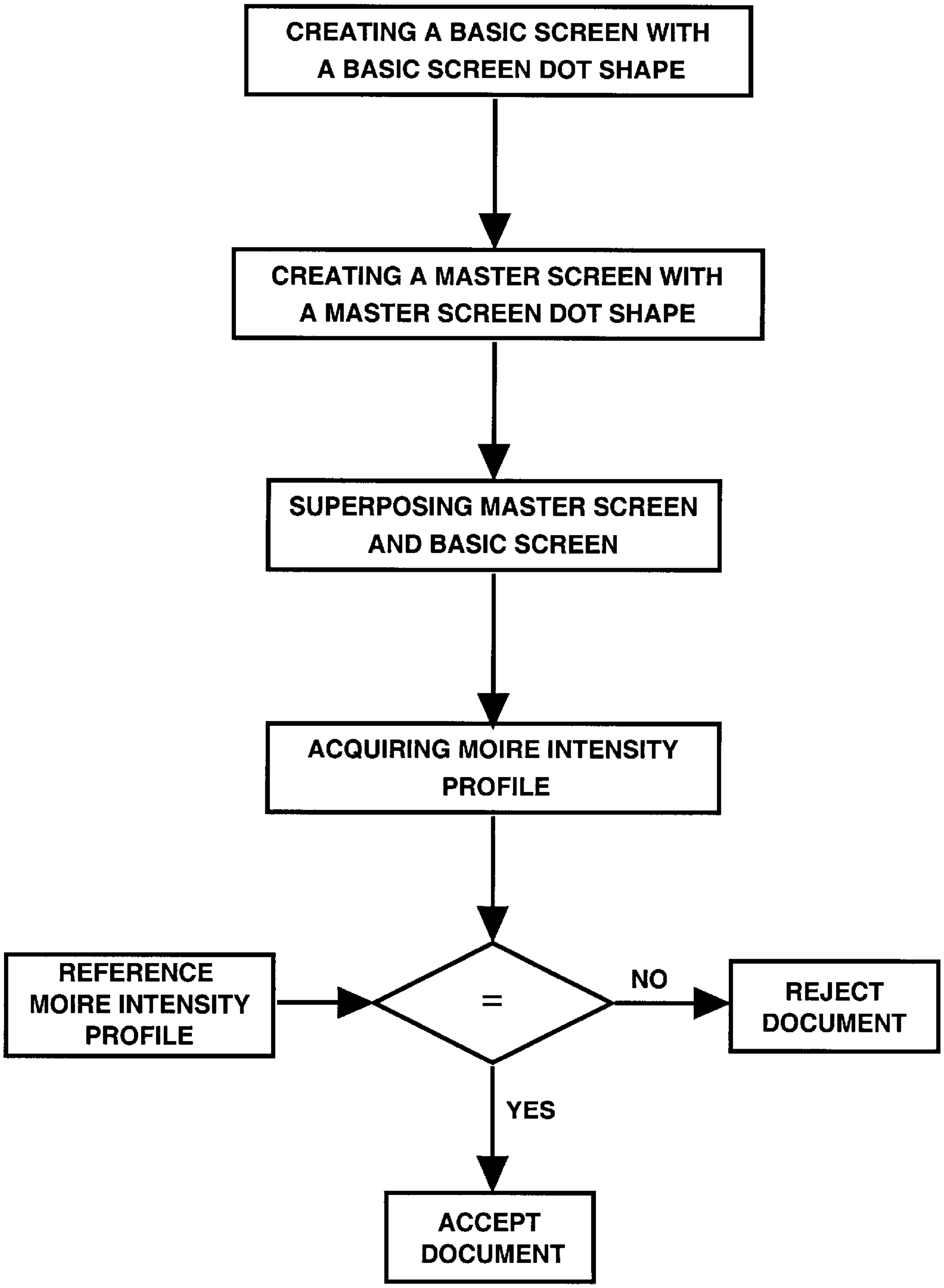
FIG. 15 shows a block diagram with the steps of methods of the invention summarized therein.

As an illustration to the above explanation, FIG. 11A shows a geometrically transformed basic screen with a constant gray level which was obtained using the dither matrix of FIG. 7A and the geometric transformation of Example 2 above; FIG. 14 shows a similar basic screen with varying gray levels (i.e. a real halftoned image), which was obtained using the same dither matrix and geometric transformation. FIG. 11B shows a geometrically transformed master screen which was obtained using the dither matrix of FIG. 9A and the same geometric transformation as in the basic screens.

It should be noted that geometrically transformed dot-screens may be also generated in other ways, and the methods explained above are given only by way of example. Further possible ways for the generation of geometrically transformed dot-screens are explained in detail in U.S. patent application Ser. No. 08/410,767 filed Mar. 27, 1995 (Ostromoukhov, Hersch), now U.S. Pat. No. 6,198,545, granted Mar. 6, 2001, and in the paper "Artistic screening" by V. Ostromoukhov and R. D. Hersch, SIGGRAPH Annual Conference, 1995, pp. 219–228.

Authentication of Documents using the Intensity Profile of Moire Patterns

The present invention concerns methods for authenticating documents and valuable articles, which are based on the intensity profile of moire patterns. Although the present invention may have several embodiments and variants, three embodiments of particular interest are given here by the way of example, without limiting the scope of the invention to these particular embodiments. In one embodiment of the present invention, the moire intensity profiles can be visualized by superposing the basic screen and the master screen which both appear on two different areas of the same document (banknote, etc.). In a second embodiment of the present invention, only the basic screen appears on the document itself, and the master screen is superposed on it by the human operator or the apparatus which visually or optically validates the authenticity of the document. In a third embodiment of this invention, the master screen is a microlens structure. An advantage of this third embodiment is that it applies equally well to both transparent support (where the moire is observed by transmittance) and to opaque support (where the moire is observed by reflection). Since the document may be printed on traditional opaque support (such as white paper), this embodiment offers high security without requiring additional costs in the document production.

It should be noted, however, that the embodiments described above are given by way of example only, and they are by no means exhaustive. For example, other embodiments are possible where the roles of master screens and basic screens are interchanged, or where master screens and basic screens are both microlens structures (or pinhole arrays), and so forth.

The method for authenticating documents comprises the steps of:

a) creating on a document a basic screen with at least one basic screen dot shape;

b) superposing a master screen with a master screen dot shape and the basic screen, thereby producing a moire intensity profile;

c) comparing said moire intensity profile with a reference moire intensity profile, and depending on the result of the comparison, accepting or rejecting the document.

It should be mentioned that in the present invention either the basic screen, the master screen or both may be geometrically transformed, and hence aperiodic.

In some embodiments of this invention, a master screen or a basic screen may be made of a microlens structure. Microlens structures are composed of microlenses arranged for example on a square or a hexagonal grid (see, for example, "Microlens arrays" by Hutley et al., Physics World, July 1991, pp. 27–32), but they can be also arranged on any other geometrically transformed periodic or aperiodic grid. They have the particularity of enlarging on each grid element only a very small region of the underlying source image, and therefore they behave in a similar manner as screens comprising small white dots or pinholes. However, microlens structures have the advantage of letting most of the incident light pass through the structure. They can therefore be used for producing moire intensity profiles either by reflection or by transmission, and the document including the basic screen may be printed on any support, opaque or transparent. It should be noted that the role of microlens arrays in generating moire effects where such a periodic microlens array is superposed on a periodic array of identical objects having the same pitch is known since long ago (see, for example, "New imaging functions of moire by fly's eye lenses" by O. Mikami, Japan Journal of Applied Physics, Vol. 14, 1975, pp. 417–418, and "New image-rotation using moire lenses" by O. Mikami, Japan Journal of Applied Physics, Vol. 14, 1975, pp. 1065–1066). But none of these known references disclosed an implementation of this phenomenon for document authentication and anti-counterfeiting. Furthermore, none of them has forseen, as the present inventors did, the possibility of using real halftoned images with full gray levels or colors as basic screens, or the possibility of using aperiodic microlens structures and aperiodic basic screens—neither for document authentication and anti-counterfeiting nor for any other goal.

The comparison in step c) above can be done either by human biosystems (a human eye and brain), or by means of an apparatus described later in the present disclosure.

The reference moire intensity profile can be obtained either by image acquisition (for example by a camera) of the superposition of a sample basic screen and a master screen, or it can be obtained by precalculation, using the mathematical theory explained in Sec. 5(B) in [Amidror98]. When the authentication is made by a human, the reference moire intensity profile may be also a memorized reference moire intensity profile, based on a previously seen reference moire intensity profile (such as a reference moire intensity profile which was previously seen in an official brochure published by the competent authorities, or a moire intensity profile seen previously in a superposition of a basic screen and a master screen in documents that are known to be authentic).

In the case where the basic screen is formed as a part of a halftoned image printed on the document, the basic screen will not be distinguishable by the naked eye from other areas on the document. However, when authenticating the document according to the present invention, the moire intensity profile will become immediatly apparent.

Any attempt to falsify a document produced in accordance with the present invention by photocopying, by means of a desk-top publishing system, by a photographic process, or by any other counterfeiting method, be it digital or analog, will inevitably influence (even if slightly) the size or the shape of the tiny screen dots of the basic (or master) screens comprised in the document (for example, due to dot-gain or ink-propagation, as is well known in the art). But since moire effects between superposed dot-screens are very sensitive to any microscopic variations in the screens, this makes any document protected according to the present invention practically impossible to counterfeit, and serves as a means to distinguish between a real document and a falsified one. Furthermore, unlike previously known moire-based anticounterfeiting methods, which are only effective against counterfeiting by digital equipment (digital scanners or photocopiers), the present invention is equally effective in the cases of analog or digital equipment.

The invention is elucidated by means of the Examples below which are provided in illustrative and non-limiting manner.

EXAMPLE I

Basic Screen and Master Screen on Same Document

Consider as a first example a document comprising a basic screen with a basic screen dot shape of the digit "1" (like FIG. 13A). In a different area of the document a master screen is printed, for example, with a master screen dot shape of small white pinholes (like FIG. 13B), giving a dark intensity level. The document is printed on a transparent support.

In this example both the basic screen and the master screen are produced with the same geometric transformation, that of Example 5 above. The (1,0,−1,0)-moire intensity profile which is obtained when the basic screen and the master screen are superposed has the form of the digit "1", as shown in FIG. 13C. As explained in Example 5 above, although the basic screen and the master screen are not periodic and have varying frequencies, the resulting moire intensity profile is periodic, and it has a good tolerance to both shifts and rotations.

It should be noted that the pinholes of the master scren and/or the dot shapes of the basic screen may be also obtained by perforation, for example by using mechanical or laser microperforation. In this case the dot or pinhole shapes can be obtained, for example, by means of a microscopic laser beam that is modulated on and off in order to perforate the subsrate in predetermined points, as explained in detail earlier. Note that in order to obtain the best effect such microperforations should be applied to an opaque support, or to a transparent support with dark ink printed on it.

In another possible variant, the pinholes of the master screen and/or the dot shapes of the basic screen may be obtained by a complete or partial removal of the color layer, for example by laser or chemical etching.

EXAMPLE II

Basic Screen on Document and Master Screen on Separate Support

As an alternative to Example I, a document may contain a basic screen, which is produced by screen dots of a chosen shape (possibly being incorporated in a halftoned image). The document is printed on a transparent support. The master screen may be identical to the master screen described in Example I, but it is not located on the document itself but rather on a separate transparent support, and the document can be authenticated by superposing the basic screen of the document with the separate master screen. For example, the superposition moire may be visualized by laying the document on the master screen, which may be fixed on a transparent sheet of plastic and attached on the top of a box containing a diffuse light source.

EXAMPLE III

Basic Screen on Document and Master Screen Made of a Microlens Structure

In the present example, the master screen has the same form as in Example II, but it is made of a microlens structure. The basic screen is as in Example II, but the document is printed on a reflective (opaque) support. In the case where the basic screen is formed as a part of a halftoned image printed on the document, the basic screen will not be distinguishable by the naked eye from other areas on the document. However, when authenticated under the microlens structure, the moire intensity profile will become immediatly apparent. Since the printing of the basic screen on the document is incorporated in the standard printing process, and since the document may be printed on traditional opaque support (such as white paper), this embodiment offers high security without requiring additional costs in the document production. This embodiment can be used in several different variants: For instance, the basic screen may be printed on an optical disk such as a CD or a DVD while the microlens structure is incorporated in its plastic box or envelope; or, in a different variant, the basic screen may be located on a document while the microlens structure is provided on a separate transparent support.

Various embodiments of the present invention can be used as security devices for the protection and authentication of multimedia products, including music, video, software products, etc. that are provided on optical disk media. Various embodiments of the present invention can be also used as security devices for the protection and authentication of other industrial packages, such as boxes for pharmaceutics, cosmetics, etc. For example, the box lid may contain the pinholes of the master screen, while the basic screen is located on a transparent part of the box; or, if the box is not transparent, a microlens structure can be used as a master screen. Packages that include a transparent part or a transparent window are very often used for selling a large variety of products, including, for example, audio and video cables, casettes, perfumes, etc., where the transparent part of the package enables customers see the product inside the package. However, transparent parts of a package may be also used advantageously for authentication and anticounter-feiting of the products, by using a part of the transparent window as a master screen (where the basic screen is located on the product itself), or as a basic screen (where the master screen is incorporated, for example, in the lid or provided on a separate transparent support), or in any other way in accordance with the present invention. It should be noted that the basic screen and the master screen can be also printed on separate security labels or stickers that are affixed or otherwise attached to the product itself or to the package. A few possible embodiments of packages which are protected by the present invention are illustrated, by way of example, in FIGS. 17–22.

Figure 17:
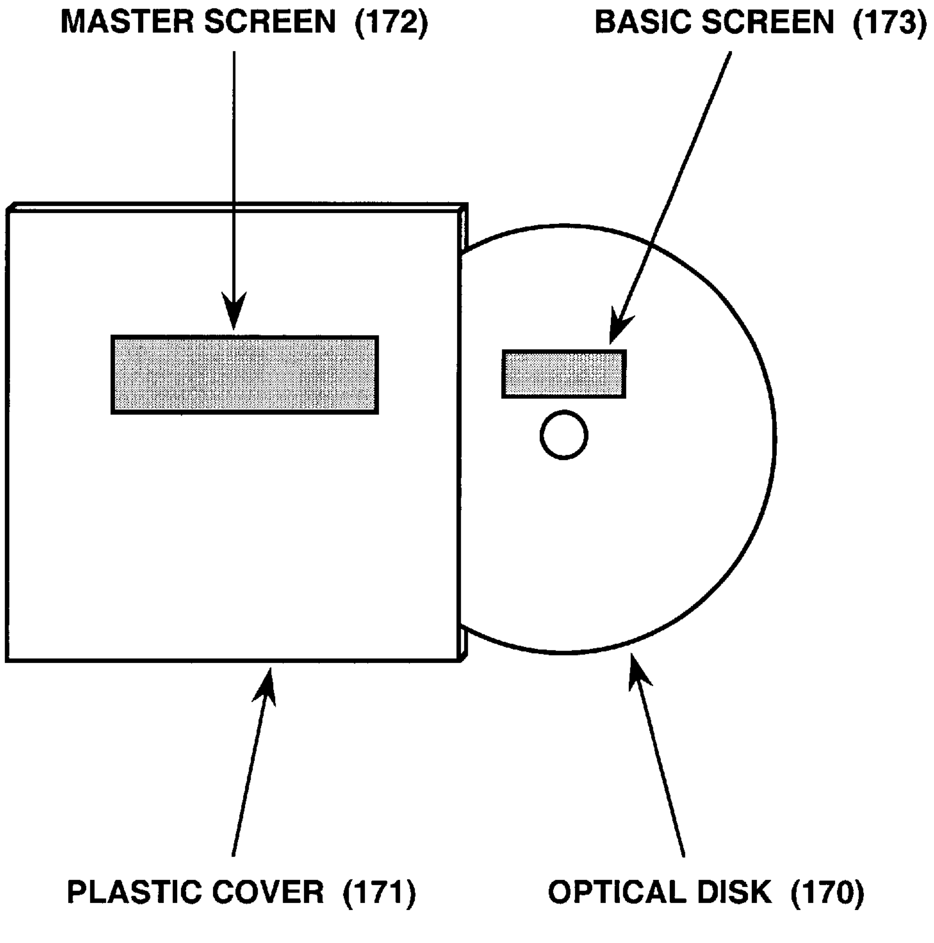
FIG. 17 illustrates schematically a possible embodiment of the present invention for the protection of optical disks (such as CDs, CD-ROMs, DVDs, etc.)
Figure 18A:
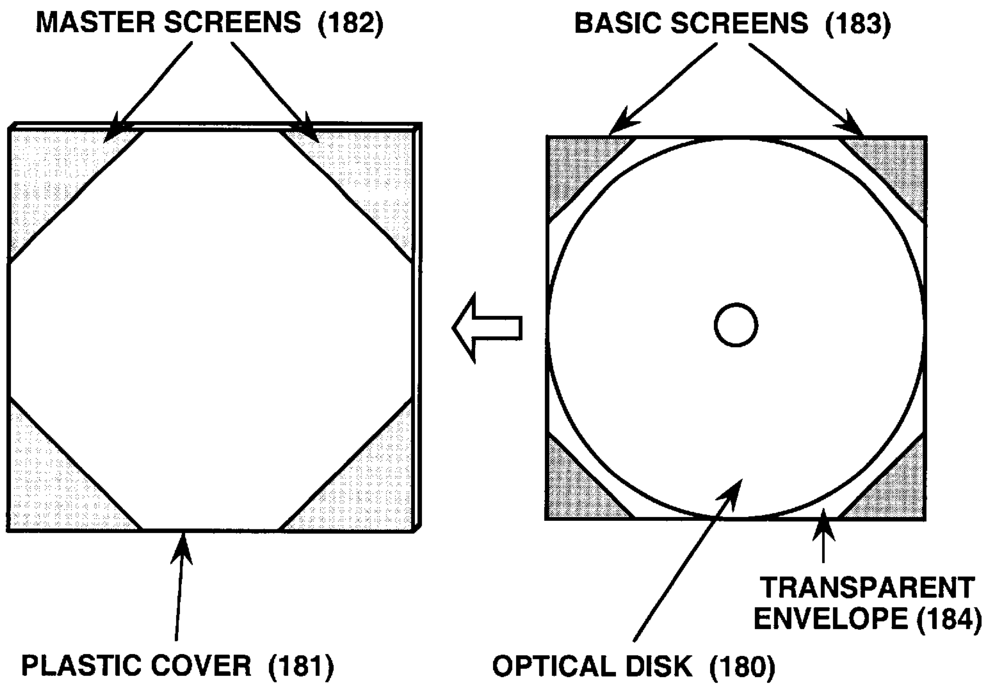
FIGS. 18A and 18B illustrate schematically another possible embodiment of the present invention for the protection of optical disks.
Figure 18B:
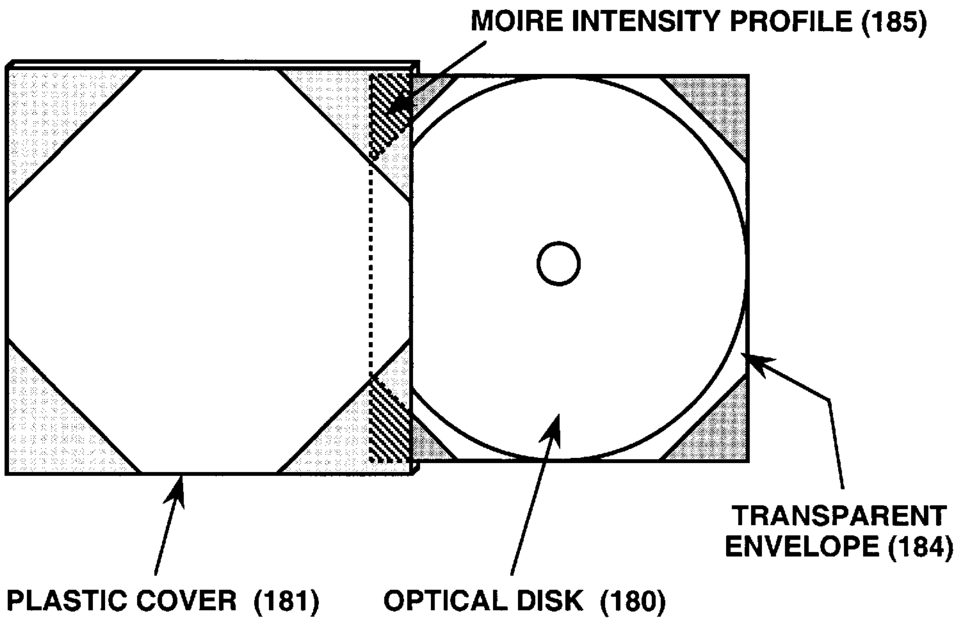

FIG. 17 illustrates schematically an optical disk 170, carrying at least one basic screen 173, and its transparent plastic cover (or box) 171, carrying at least one master screen 172. FIGS. 18A and 18B illustrate another possible embodiment, in which an optical disk 180 is first protected by a transparent envelope 184, which carries basic screens 183; the disk with its transparent envelope are then kept within a transparent plastic cover (or box) 181, which carries master screens 182. In both cases, when the optical disk is located inside its plastic cover, moire intensity profiles are generated between at least one master screen and at least one basic screen; and while the disk is slowly inserted or taken out of its plastic cover 181, these moire intensity profiles (see 185 in FIG. 18B) vary dynamically. These moire intensity profiles serve therefore as a reliable authentication means and guarantee that both the disk and its package are indeed authentic. In a typical case, the moire intensity profiles may comprise the logo of the company, or any other desired text or symbols, either in B/W or in color.

Figure 19A:
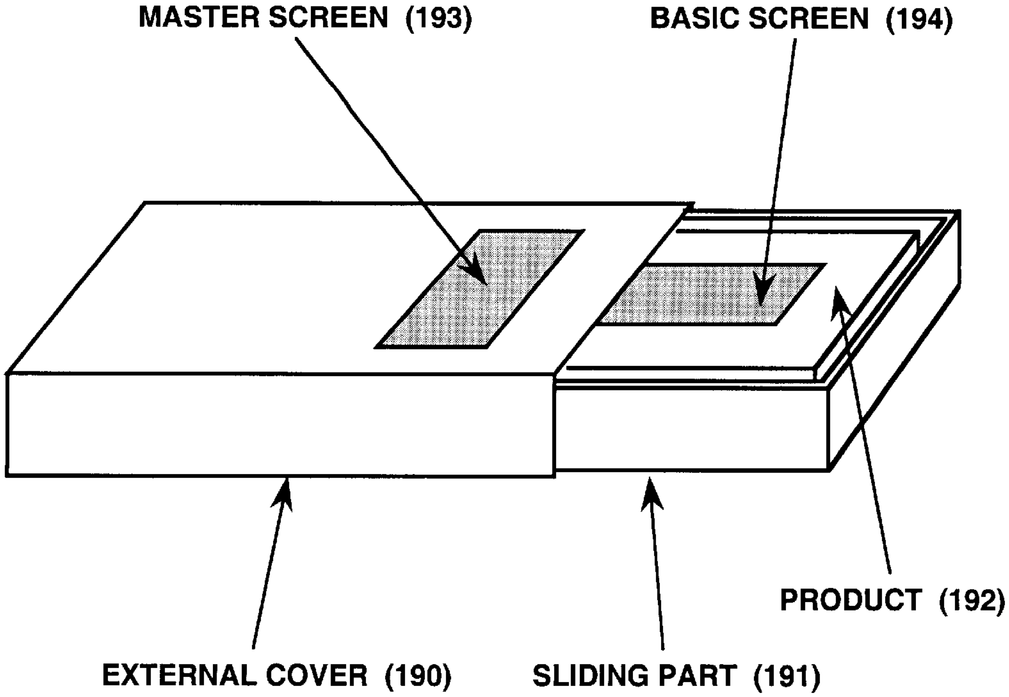
FIG. 19A illustrates schematically a possible embodiment of the present invention for the protection of products that are packed in a box comprising a sliding part.
Figure 19B:
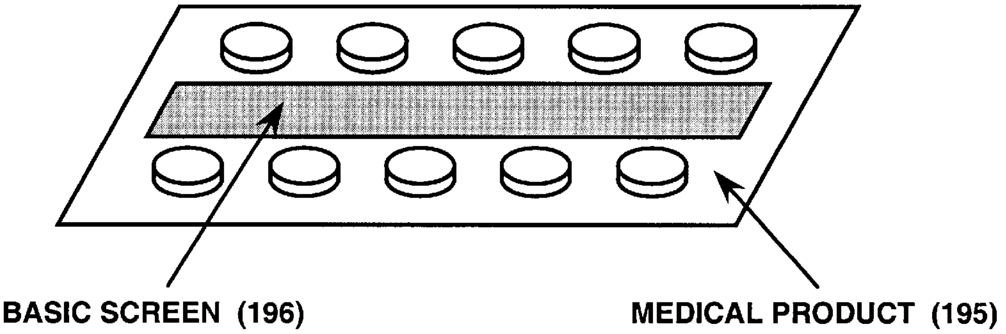
FIG. 19B illustrates a possible use of this embodiment for the protection of pharmaceutical products.

FIG. 19A illustrates schematically a possible embodiment of the present invention for the protection of products that are packed in a box comprising a sliding part 191 and an external cover 190, where the product itself (192) carries at least one basic screen 194, and the external cover 190 carries at least one master screen 193. FIG. 19B illustrates a possible use of this embodiment for the protection of pharmaceutical products, medical drugs, etc. In this case product 192 of FIG. 19A is a medical product 195, carrying at least one basic screen 196. Product 195 may be preferably transparent, but if it is opaque, the moire intensity profiles can be observed by reflectance. Basic screen 196 may be preferably located on the back side of medical product 195, so that it will be in close contact with master screen 193 of the external cover 190 as the sliding part 191 is moved inwards or outwards within external cover 190.

Figure 20:
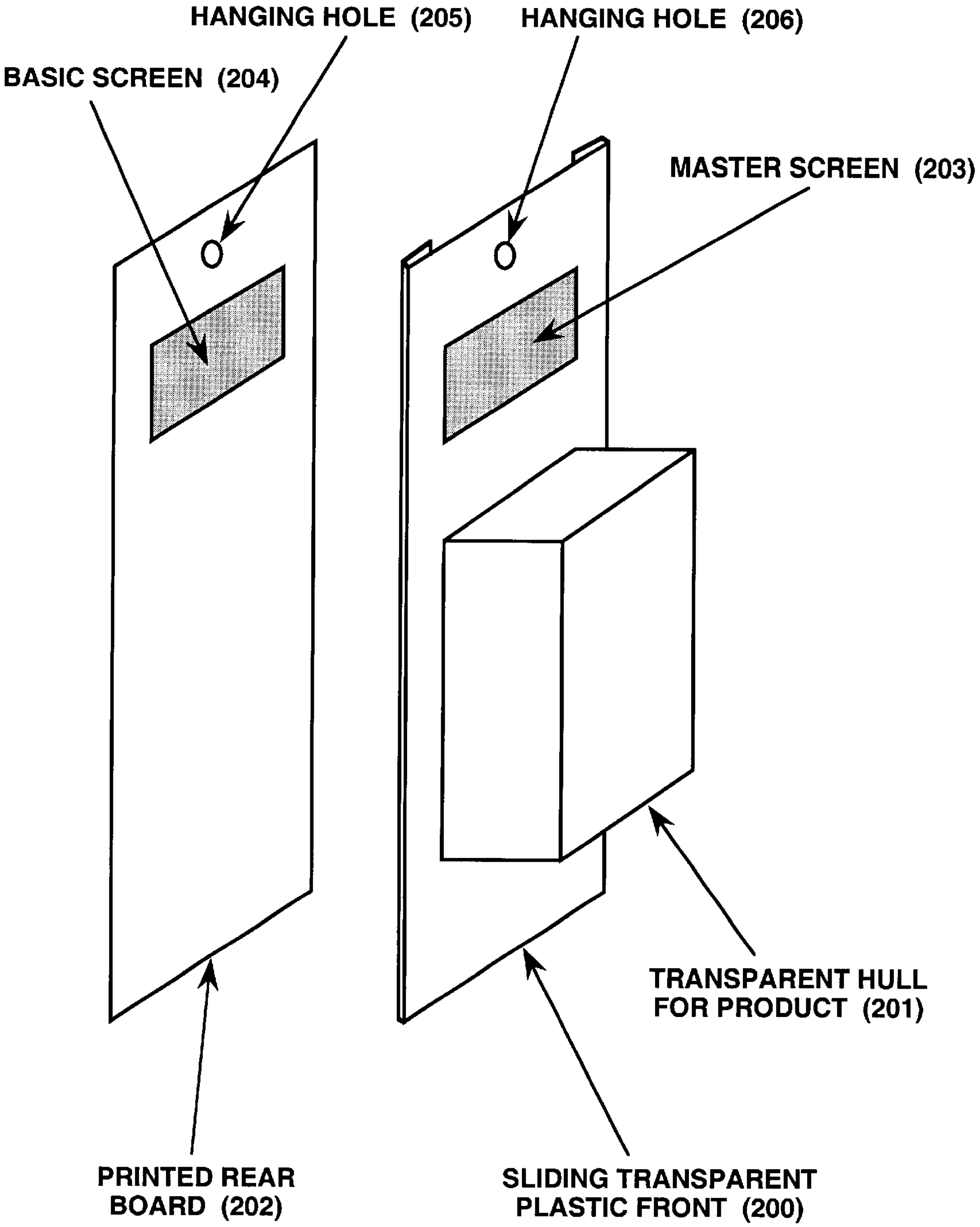
FIG. 20 illustrates schematically another possible embodiment of the present invention for the protection of products that are marketed in a package comprising a sliding transparent plastic front.

FIG. 20 illustrates schematically another possible embodiment of the present invention for the protection of products that are marketed in a package comprising a sliding transparent plastic front 200 and a rear board 202, which may be printed and carry a description of the product. Such packages are often used for selling video and audio cables, or any other products, that are kept within the transparent hull (or recepient) 201 of plastic front 200. Often packages of this kind have a small hole 205 in the top of the rear board and a matching hole 206 in plastic front 200, in order to facilitate hanging the packages in the selling points. In accordance with the present invention, the rear board 202 may carry at least one basic screen 204, and the plastic front may carry at least one master screen 203, so that when the package is closed moire intensity profiles are generated between at least one master screen and at least one basic screen. Here, again, while the sliding plastic front 200 is slided along the rear board 202, the moire intensity profiles vary dynamically.

Figure 21:
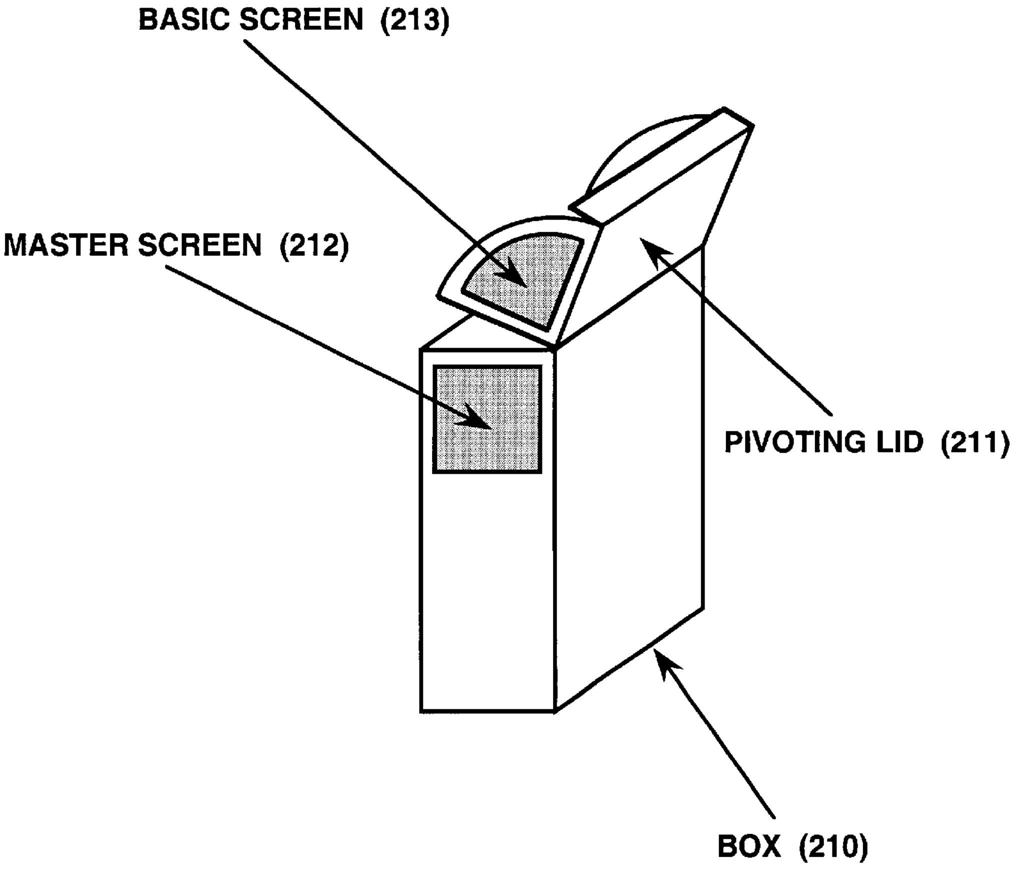
FIG. 21 illustrates schematically yet another possible embodiment of the present invention for the protection of products that are packed in a box with a pivoting lid.

FIG. 21 illustrates schematically yet another possible embodiment of the present invention for the protection of products that are packed in a box 210 with a pivoting lid 211. The pivoting lid 211 carries at least one basic screen 213, and the box itself carries at least one master screen 212. When the box is closed basic screen 213 is located just behind master screen 212, so that moire intensity profiles are generated. And while pivoting lid 211 is opened, the moire intensity profiles vary dynamically.

Figure 22:
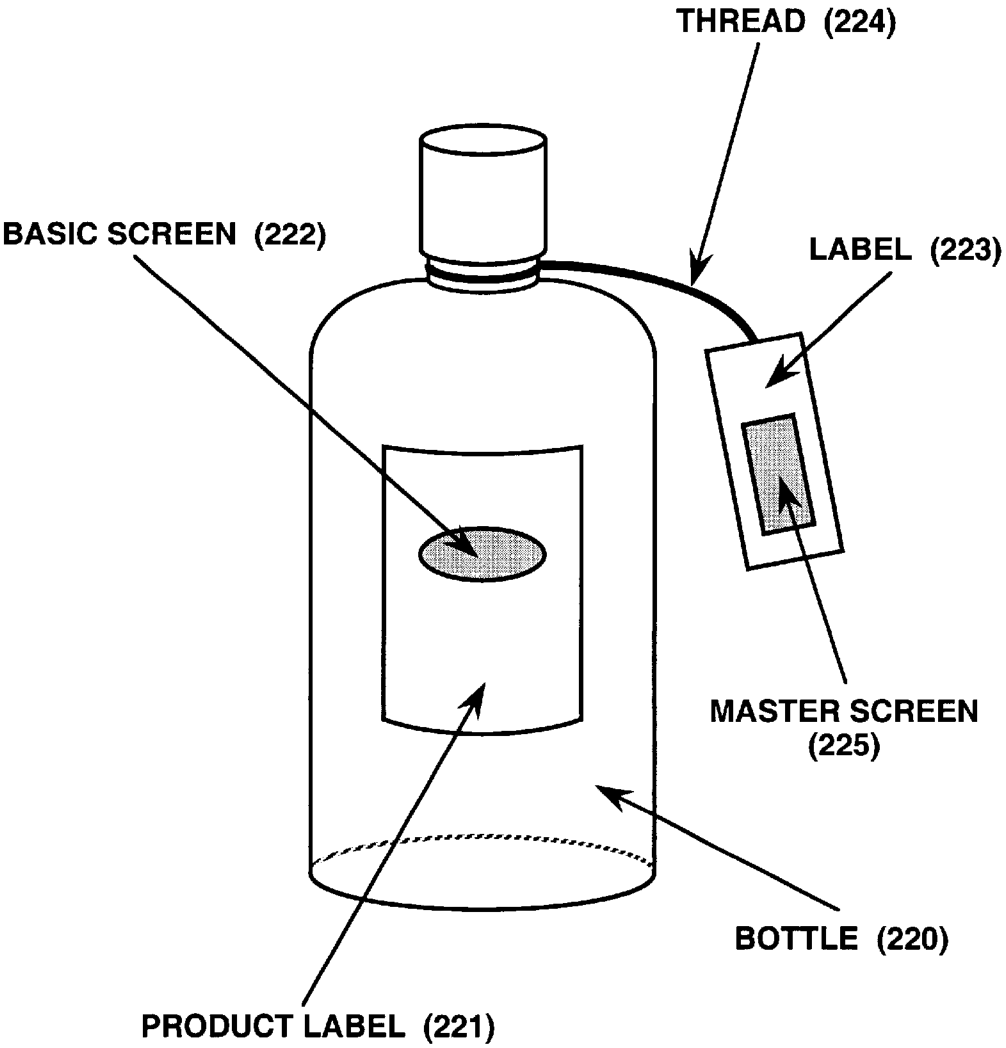
FIG. 22 illustrates schematically yet another possible embodiment of the present invention for the protection of products that are marketed in bottles (such as whiskey, perfumes, etc.)

FIG. 22 illustrates schematically yet another possible embodiment of the present invention for the protection of products that are marketed in bottles (such as whiskey, perfumes, etc.). For example, the product label 221 which is affixed to bottle 220 may carry basic screen 222, while another label 223, which may be attached to the bottle by a decorative thread 224, carries master screen 225. The authentication of the product can be done in this case by superposing label 223 on label 221, so that master screen 225 and basic screen 222 generate clearly visible moire intensity profiles, for example with the name of the product. In cases where the bottle is transparent the moire intensity profiles can be visualized by transmittance; otherwise they can be visualized by reflection.

Obviously, in cases where the master screen and the basic screen may slide on top of each other (such as in the embodiments shown in FIGS. 18A, 18B, 19A, 19B, 20, etc.) one will preferrably use moire intensity profiles that have a good tolerance to layer shifts, like in Example 2 above. In cases where the master screen and the basic screen may rotate on top of each other (such as in the embodiment shown in FIG. 21) one will preferrably use moire intensity profiles that have a good tolerance to layer rotations, like in Example 3 above. As already mentioned earlier, moire intensity profiles that are generated by periodic layers provide good tolerances to both shifts and rotations, and they can be therefore used in all cases.

In many of the examples above, one may also exchange master screens and basic screens in their locations or in their roles.

It should be noted that in all of the examples the basic and the master screens can be either overt ot covert; in the latter case, the basic screen is a masked basic screen, meaning that the information carried by the basic screen is masked using any of a variety of techniques, for example as described by the present inventors in U.S. Pat. No. 5,995,638.

The Multichromatic Case

As previously mentioned, the present invention is not limited only to the monochromatic case; on the contrary, it may largely benefit from the use of different colors in any of the dot-screens being used, either periodic or aperiodic.

One way of using colored dot-screens in the present invention is similar to the standard multichromatic printing technique, where several (usually three or four) dot-screens of different colors (usually: cyan, magenta, yellow and black) are superposed in order to generate a full-color image by halftoning. By way of example, if one of these colored dot-screens is used as a basic screen according to the present invention, the moire intensity profile that will be generated with a black-and-white master screen will closely approximate the color of the color basic screen. If several of the different colored dot-screens are used as basic screens according to the present invention, each of them will generate with an achromatic master screen a moire intensity profile approximating the color of the basic screen in question.

Another possible way of using colored dot-screens in the present invention is by using a basic screen whose individual screen elements are composed of sub-elements of different colors, as disclosed by the present inventors in their previous U.S. Pat. No. 5,995,638, also shown in FIGS. 14A–14C therein. An important advantage of this method as an anti-counterfeiting means is gained from the extreme difficulty in printing perfectly juxtaposed sub-elements of the screen dots, due to the high precision it requires between the different colors in multi-pass color printing. Only the best high-performance security printing equipment which is used for printing security documents such as banknotes is capable of giving the required precision in the alignment (hereinafter: "registration") of the different colors. Registration errors which are unavoidable when counterfeiting the document on lower-performance equipment will cause small shifts between the different colored sub-elements of the basic screen elements; such registration errors will be largely magnified by the moire effect, and they will significantly corrupt the form and the color of the moire profiles obtained by the master screen.

Hence, counterfeiters trying to falsify the color document by printing it using a standard printing process will also have, in addition to the problems of creating the basic screen, problems of color registration. Without correct color registration, the basic screen will incorporate distorted screen dots. Therefore, the intensity profile of the moire acquired with the master screen applied to a counterfeited document will clearly distinguish itself, in terms of form and intensity as well as in terms of color, from the moire profile obtained when applying the master screen to the non-counterfeited document. Since counterfeiters will always have color printers with less accuracy than the official bodies responsible for printing the original valuable documents (banknotes, checks, etc.), the disclosed authentication method remains valid even with the quality improvement of color reproduction technologies.

Another advantage of the multichromatic case is obtained when using a basic screen with varying frequencies. Due to the high frequencies incorporated in some areas of the variable-frequency basic screen it is impossible to reproduce its screen dot elements using standard CMYK (cyan, magenta, yellow and black) color separation. Hence, if the basic screen is printed on the document using a non-standard ink color (such as blue), it will not be possible to falsify it using standard color printing, which requires a superposition of two or more standard inks. This provides an additional protection against counterfeiting at the same price.

One possible way for printing color images using standard or non-standard color inks (standard or non-standard color separation) has been described in U.S. patent application Ser. No. 09/477,544 filed Jan. 4, 2000 (Ostromoukhov, Hersch) and in the paper "Multi-color and artistic dithering" by V. Ostromoukhov and R. D. Hersch, SIGGRAPH Annual Conference, 1999, pp. 425–432. This method, hereafter called "multicolor dithering", uses dither matrices similar to standard dithering, as described above, and provides for each pixel of the basic screen (the halftoned image) a means for selecting its color, i.e. the ink, ink combination or the background color to be assigned for that pixel. A geometric transformation can be then applied to this dither matrix in the same way as already explained above for monochromatic dithering. It should be noted, as explained in detail in the above mentioned references, that the multicolor dithering method ensures by construction that the contributing colors are printed side by side. This method is therefore ideal for high-end printing equipment that benefits from high registration accuracy, and that is capable of printing with non-standard inks, thus making the printed document very difficult to falsify, and easy to authenticate by means of the disclosed method, as explained above.

Apparatus for the Authentication of Documents Using the Intensity Profile of Moire Patterns An apparatus for the visual authentication of documents comprising a basic screen may comprise a master screen (such as a dot-screen, a pinhole screen, a microlens structure, etc.) prepared in accordance with the present disclosure, which is to be placed on the basic screen of the document, while the document itself is placed on the top of a box containing a diffuse light source (or possibly under a source of diffuse light, in case the master screen is a microlens structure and the moire intensity profile is observed by reflection). If the authentication is made by visualization, i.e. by a human operator, human biosystems (a human eye and brain) are used as a means for the acquisition of the moire intensity profile produced by the superposition of the basic screen and the master screen, and as a means for comparing the acquired moire intensity profile with a reference (or memorized) moire intensity profile. The source of light in this case may be either natural (such as daylight) or artificial.

Figure 23:
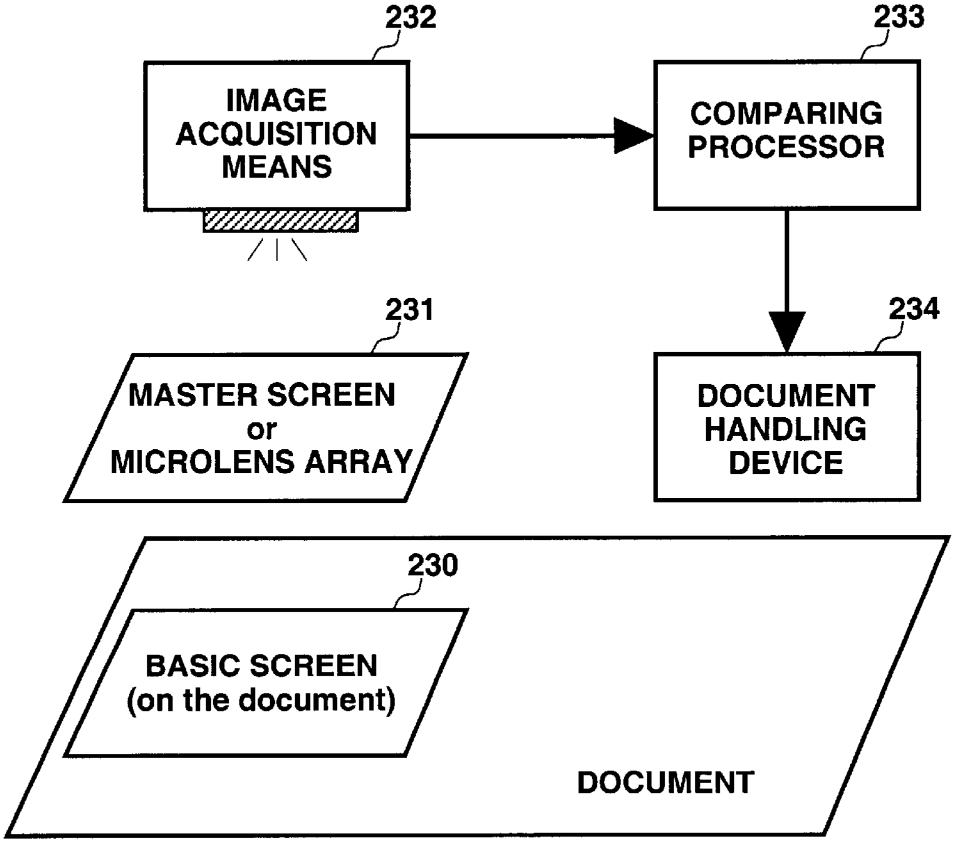
FIG. 23 is a block diagram of an apparatus for the authentication of documents by using the intensity profile of moire patterns.

An apparatus for the automatic authentication of documents, whose block diagram is shown in FIG. 23, comprises a master screen 231 (either a dot-screen or a microlens structure), an image acquisition means (232) such as a camera, a source of light (not shown in the drawing), and a comparing processor (233) for comparing the acquired moire intensity profile with a reference moire intensity profile. In case the match fails, the document will not be authenticated and the document handling device of the apparatus (234) will reject the document. The comparing processor 233 can be realized by a microcomputer comprising a processor, memory and input-output ports. An integrated one-chip microcomputer can be used for that purpose. For automatic authentication, the image acquisition means 232 needs to be connected to the microcomputer incorporating the comparing processor 233, which in turn controls a document handling device 234 for accepting or rejecting a document to be authenticated, according to the comparison operated by the microprocessor.

The reference moire intensity profile can be obtained either by image acquisition (for example by means of a camera) of the superposition of a sample basic screen and the master screen, or it can be obtained by precalculation.

The comparing processor makes the image comparison by matching a given image with a reference image; examples of ways of carrying out this comparison have been presented in detail by the present inventors in U.S. Pat. No. 5,995,638. This comparison produces at least one proximity value giving the degree of proximity between the acquired moire intensity profile and the reference moire intensity profile. These proximity values are then used as criteria for making the document handling device accept or reject the document. Note that in the case of aperiodic moires the authentication may be based on the comparison of at least one of the elements of the aperiodic moire, as already explained above.

Advantages of the Present Invention

The advantages of the new authentication and anti-counterfeiting methods disclosed in the present invention are numerous.

First, geometrically transformed dot-screens are much more difficult to design, and therefore very hard to reverse engineer and to falsify. This is all the more so when the geometric transformation used is kept secret.

Second, any dot-screen with varying frequencies which is incorporated in a document becomes in itself (in addition to its role in generating the intended moire intensity profiles when the master screen is superposed on top of it) a screen trap against any attempts to digitally scan or reproduce the document: If the dot-screen contains a large range of gradually varying frequencies, the falsifier's scanning or reproduction frequencies will unavoidably clash with some of the dot-screen's frequencies or their harmonics and generate in the falsified document highly visible undesired moire effects (similar to the effects described in United Kingdom Pat. No. 1,138,011 as mentioned above in the section "background of the invention"). This further increases the security of the document by providing an additional security feature within the same security element, without having to sacrifice additional area of the document.

Third, due to the high frequencies incorporated in some areas of the variable-frequency basic screen it is impossible to reproduce its screen dot elements using standard CMYK (cyan, magenta, yellow and black) color separation. Hence, if the basic screen is printed on the document using a non-standard ink color (such as blue), it will not be possible to falsify it using standard color printing, which requires a superposition of two or more standard inks. This provides an additional protection at the same price.

The fact that moire effects generated between superposed dot-screens are very sensitive to any microscopic variations in the screened layers makes any document protected according to the present invention practically impossible to counterfeit, and serves as a means to easily distinguish between a real document and a falsified one.

Furthermore, unlike previously known moire-based anti-counterfeiting methods, which are only effective against counterfeiting by digital equipment (digital scanners or photocopiers), the present invention is equally effective in the cases of analog or digital equipment.

A further important advantage of the present invention is that it can be used for authenticating documents printed on any kind of support, including paper, plastic materials, etc., which may be transparent or opaque. Furthermore, the present invented method can be incorporated into halftoned B/W or color images (simple constant images, tone or color gradations, or complex photographs). Because it can be produced using the standard document printing process, the present method offers high security at the same cost as standard state of the art document production.

Figure 10A:
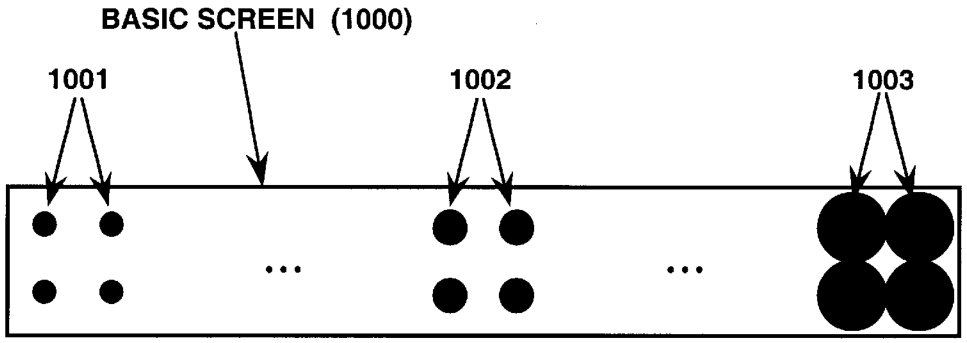
FIG. 10A shows schematically a variable intensity basic screen whose screen dots vary gradually in their size according to the gray levels.
Figure 10B:
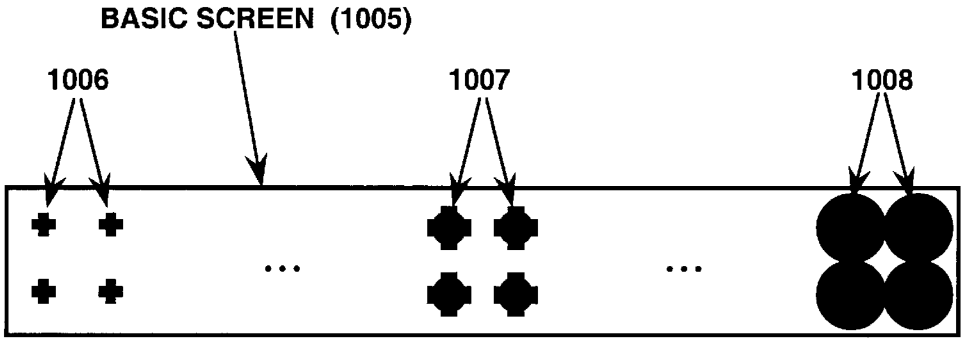
FIG. 10B shows schematically a variable intensity basic screen whose screen dots vary gradually both in their size and in their shapes according to the gray levels.
Figure 10C:
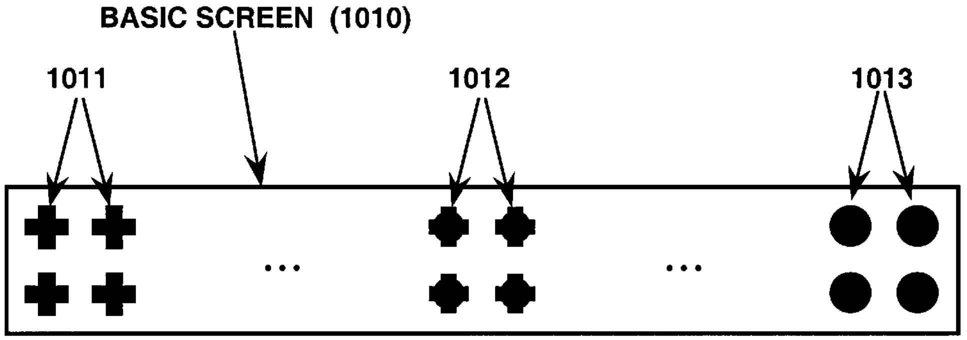
FIG. 10C shows schematically a constant intensity basic screen whose screen dots vary gradually in their shapes according to their position within the basic screen, without affecting the intensity levels.

Furthermore, the dot-screens printed on the document in accordance with the present invention need not be of a constant intensity level. On the contrary, they may include dots of gradually varying sizes and shapes, and they can be incorporated (or dissimulated) within any variable intensity halftoned image on the document (such as a portrait, landscape, or any decorative motif, which may be different from the motif generated by the moire effect in the superposition). An example of a variable intensity basic screen consisting of dots of gradually varying sizes and shapes, which is incorporated into a real halftoned image, is shown in FIG. 14. It should be noted that in addition to the variation in the shape and the size of the basic screen dots according to the gray levels, as shown schematically in FIG. 10A and FIG. 10B, in an alternative variant the shape of the basic screen dots may be varied according to their position within the image, without affecting the gray level. For example, as illustrated schematically in FIG. 10C, a band with basic screen 1010 of a constant gray level, consisting of gradually varying dot shapes (1011–1013), may be located along the border of the document. When the corresponding master screen is superposed, the resulting moire intensity profiles will vary in their shapes along this band. Similarly, the color of the basic screen dots may be also gradually varied according to their position within the image. In this case, when the corresponding master screen is superposed, the resulting moire intensity profiles will vary in their colors along the band. Each of these variants has the advantage of making falsifications still more difficult, thus further increasing the security provided by the present invention.

Yet a further advantage of the present invention is that it can be used, depending on the needs, either as an overt means of document protection which is intended for the general public; or as a covert means of protection which is only detectable by the competent authorities or by automatic authentication devices; or even as a combination of the two, thereby permitting various levels of protection.

REFERENCES CITED

U.S. Patent Documents

U.S. Pat. No. 5,995,638 (Amidror, Hersch), November 1999. Methods and apparatus for authentication of documents by using the intensity profile of moire patterns.

U.S. Pat. No. 6,249,588 (Amidror, Hersch), June 2001. Method and apparatus for authentication of documents by using the intensity profile of moire patterns.

U.S. Pat. No. 5,018,767 (Wicker), May 1991. Counterfeit protected document.

U.S. Pat. No. 5,275,870 (Halope et al.), January 1994. Watermarked plastic support.

U.S. Pat. No. 5,396,559 (McGrew), March 1995. Anti-counterfeiting method and device utilizing holograms and pseudorandom dot patterns.

U.S. Pat. No. 5,712,731 (Drinkwater et. al.), January 1998. Security device for security documents such as bank notes and credit cards.

U.S. Pat. No. 6,198,545 (Ostromoukhov, Hersch), March 2001. Method and apparatus for generating halftone images by evolutionary screen dot contours.

U.S. patent application Ser. No. 09/477,544 (Ostromoukhov, Hersch). Method and apparatus for generating digital halftone images by multi color dithering. Filing date: Jan. 4, 2000.

Foreign Patent Documents

United Kingdom Patent No. 1,138,011 (Canadian Bank Note Company), Dec. 1968. Improvements in printed matter for the purpose of rendering counterfeiting more difficult.

United Kingdom Patent Application No. 2,224,240 A (Kenrick & Jefferson), May 1990. Copy protection of multi-color documents.

Other Publications

Fourier-based analysis and synthesis of moires in the superposition of geometrically transformed periodic structures, by I. Amidror and R. D. Hersch; Journal of the Optical Society of America A, Vol. 15, 1998; pp. 1100–1113.

The Theory of the Moire Phenomenon, by I. Amidror, Kluwer Academic Publishers, 2000.

A Generalized Fourier-Based Method for the Analysis of 2D Moire Envelope-Forms in Screen Superpositions, by I. Amidror; Journal of Modern Optics, Vol. 41, No. 9, 1994; pp. 1837–1862.

Making Money, by G. Stix; Scientific American, March 1994; pp. 81–83.

Digital Halftoning, by R. Ulichney, The MIT Press, 1988; Chapter 5.

Microlens arrays, by M. Hutley et al.; Physics World, July 1991; pp. 27–32.

New imaging functions of moire by fly's eye lenses, by O. Mikami; Japan Journal of Applied Physics, Vol. 14, No. 3, 1975; pp. 417–418.

New image-rotation using moire lenses, by O. Mikami; Japan Journal of Applied Physics, Vol. 14, No. 7, 1975; pp. 1065–1066.

Digital Image Processing, by W. K. Pratt, Wiley-Interscience, 1991; Chapter 14.

Artistic screening, by V. Ostromoukhov and R. D. Hersch; SIGGRAPH Annual Conference, 1995, pp. 219–228.

Multi-color and artistic dithering, by V. Ostromoukhov and R. D. Hersch; SIGGRAPH Annual Conference, 1999, pp. 425–432.

Application of laser technology to introduce security features on security documents in order to reduce counterfeiting, by W. Hospel; SPIE Vol. 3314, 1998, pp. 254–259.

Halftone patterns for arbitrary screen periodicities, by T. S. Rao and G. R. Arce; Journal of the Opt. Soc. of America A, Vol. 5, 1988, pp. 1502–1511.

Halftone images: spatial resolution and tone reproduction, by O. Bryngdahl; Journal of the Opt. Soc. of America, Vol. 68, 1978, pp. 416–422.

We claim:

1. A method for authenticating documents by using at least one moire intensity profile, the method comprising the steps of:

a) creating on a document at least one basic screen with at least one basic screen dot shape;

b) superposing a master screen with a master screen dot shape and the basic screen, thereby producing a moire intensity profile; and c) comparing said moire intensity profile with a reference moire intensity profile and depending on the result of the comparison, accepting or rejecting the document, where at least one screen selected from the set comprising the basic screens and the master screen is an aperiodic screen.

2. The method of claim 1, where the reference moire intensity profile is obtained by image acquisition of the superposition of the basic screen and the master screen.

3. The method of claim 1, where the reference moire intensity profile is obtained by precalculation.

4. The method of claim 1, where the reference moire intensity profile is a memorized reference moire intensity profile seen previously in a superposition of a basic screen and a master screen in documents that are known to be authentic.

5. The method of claim 1, where comparing the moire intensity profile with a reference moire intensity profile is done by visualization.

6. The method of claim 1, where the basic screen and the master screen are located on a transparent support, and where comparing the moire intensity profile with a reference moire intensity profile is done by visualization.

7. The method of claim 6, where the basic screen and the master screen are located on two different areas of the same document, thereby enabling the visualization of the moire intensity profile to be performed by superposition of the basic screen and the master screen of said document.

8. The method of claim 1, where the basic screen is created by a process for transferring an image onto a support, said process being selected from the set comprising lithographic, photolithographic, photographic, electrophotographic, engraving, etching, perforating, embossing, ink jet and dye sublimation processes.

9. The method of claim 1, where the master screen is created by a process for transferring an image onto a support, said process being selected from the set comprising lithographic, photolithographic, photographic, electrophotographic, engraving, etching, perforating, embossing, ink jet and dye sublimation processes.

10. The method of claim 1, where at least one screen selected from the set comprising the basic screen and the master screen contains tiny dots.

11. The method of claim 1, where the basic screen is a multichromatic basic screen whose individual elements are colored, thereby generating a color moire image when the master screen is superposed on said basic screen.

12. The method of claim 1, where the basic screen is a masked basic screen, thereby offering a covert means of authentication and making the re-engineering of the basic screen of the document extremely difficult.

13. The method of claim 1, where at least one screen selected from the set comprising the basic screens and the master screen includes dots of gradually varying shapes and is incorporated within a variable intensity halftoned image.

14. The method of claim 13, where at least one screen is a color halftoned image.

15. The method of claim 1, where at least one screen selected from the set comprising the basic screens and the master screen is a microlens structure.

16. The method of claim 15, where the document comprising the basic screen is printed on an opaque support, thereby allowing the moire intensity profile to be produced by reflection.

17. The method of claim 15, where the basic screen is located on an opaque support, and where comparing the moire intensity profile with a reference moire intensity profile is done by visualization.

18. The method of claim 1, where the aperiodic screen is a geometrically transformed screen.

19. The method of claim 1, where the moire intensity profile produced by superposing the master screen and a basic screen is a periodic moire intensity profile.

20. The method of claim 1, where the moire intensity profile produced by superposing the master screen and a basic screen deviates from perfect periodicity, thereby having an increased tolerance to angular and shift mismatches between the master screen and the basic screen.

21. The method of claim 1, where at least one screen comprises varying frequencies, thereby further becoming in itself a screen trap against attempts to digitally reproduce the document.

22. The method of claim 1, where at least one screen comprises varying frequencies, and is printed on the document using a non-standard ink color, thus making it impossible to faithfully reproduce its screen dot elements using a standard cyan, magenta, yellow and black color separation and therefore to falsify the document using standard color printing.

23. The method of claim 1, where at least one screen is obtained by perforation.

24. The method of claim 1, where at least one screen is obtained by etching.

25. The method of claim 1, where comparing the moire intensity profile with a reference moire intensity profile is done by comparing at least one element of the moire intensity profile with at least one element of the reference moire intensity profile.

26. A method for authenticating documents by using at least one moire intensity profile, the method comprising the steps of:

a) creating on a document at least one basic screen with at least one basic screen dot b) superposing a master screen with a master screen dot shape and the basic screen, thereby producing a moire intensity profile; and c) comparing said moire intensity profile with a reference moire intensity profile and depending on the result of the comparison, accepting or rejecting the document.

where at least one screen selected from the set comprising the basic screen and the master screen is a pinhole screen.

27. A method for authenticating documents by using at least one moire intensity profile, the method comprising the steps of:

a) creating on a document at least one basic screen with at least one basic screen dot shape;

b) superposing a master screen with a master screen dot shape and the basic screen, thereby producing a moire intensity profile; and c) comparing said moire intensity profile with a reference moire intensity profile and depending on the result of the comparison, accepting or rejecting the document, where at least one screen selected from the set comprising the basic screen and the master screen is obtained by perforation.

28. A method for authenticating documents by using at least one moire intensity profile, the method comprising the steps of:

a) creating on a document at least one basic screen dot shape;

b) superposing a master screen with a master screen dot shape and the basic screen, thereby producing a moire intensity profile; and c) comparing said moire intensity profile with a reference moire intensity profile and depending on the result of the comparison, accepting or rejecting the document, where at least one screen selected from the set comprising the basic screen and the master screen is obtained by etching.

29. A method for authenticating documents by using at least one moire intensity profile, the method comprising the steps of:

a) creating on a document at least one basic screen with at least one basic screen dot shape;

b) superposing a master screen with a master screen dot shape and the basic screen, thereby producing a moire intensity profile; and c) comparing said moire intensity profile with a reference moire intensity profile and depending on the result of the comparison, accepting or rejecting the document, where at least one screen selected from the set comprising the basic screens and the master screen includes dots whose shapes gradually vary according to their position, thereby generating in the screen superposition moire intensity profiles which vary in their shapes according to their position.

30. A method for authenticating documents by using at least one moire intensity profile, the method comprising the steps of:

a) creating on a document at least one basic screen with at least one basic screen dot shape;

b) superposing a master screen with a master screen dot shape and the basic screen, thereby producing a moire intensity profile; and c) comparing said moire intensity profile with a reference moire intensity profile and depending on the result of the comparison, accepting or rejecting the document, where at least one screen selected from the set comprising the basic screens and the master screen includes dots whose colors gradually vary according to their position, thereby generating in the screen superposition moire intensity profiles which vary in their colors according to their position.

31. A method for authenticating documents by using at least one moire intensity profile, the method comprising the steps of:

a) creating on a document at least one basic screen with at least one basic screen dot shape;

b) superposing a master screen with a master screen dot shape and the basic screen, thereby producing a moire intensity profile; and c) comparing said moire intensity profile with a reference moire intensity profile and depending on the result of the comparison, accepting or rejecting the document, where the document is a valuable product.

32. A method for authenticating documents by using at least one moire intensity profile, the method comprising the steps of:

a) creating on a document at least one basic screen with at least one basic screen dot shape;

b) superposing a master screen with a master screen dot shape and the basic screen, thereby producing a moire intensity profile; and c) comparing said moire intensity profile with a reference moire intensity profile and depending on the result of the comparison, accepting or rejecting the document, where the document is a package of a valuable product.

33. The method of claim 32, where at least one basic screen and at least one master screen are located in different parts of the product package.

34. A method for authenticating documents by using at least one moire intensity profile, the method comprising the steps of:

a) creating on a document at least one basic screen with at least one basic screen dot shape;

b) superposing a master screen with a master screen dot shape and the basic screen, thereby producing a moire intensity profile; and c) comparing said moire intensity profile with a reference moire intensity profile and depending on the result of the comparison, accepting or rejecting the document, where the document is affixed to a valuable product.

35. The method of claim 34, where at least one basic screen and at least one master screen are located in different parts of the document that is affixed to the valuable product.

36. A method for authenticating documents by using at least one moire intensity profile, the method comprising the steps of:

a) creating on a document at least one basic screen with at least one basic screen dot shape;

b) superposing a master screen with a master screen dot shape and the basic screen, thereby producing a moire intensity profile; and c) comparing said moire intensity profile with a reference moire intensity profile and depending on the result of the comparison, accepting or rejecting the document, where at least one screen selected from the set comprising the basic screens and the master screen is located on a valuable product, and where at least one other screen selected from the same set is located on the valuable product's package.

37. An apparatus for authentication of documents making use of at least one moire intensity profile, the apparatus comprising:

a) a master screen;

b) an image acquisition means arranged to acquire a moire intensity profile produced by the superposition of a basic screen located on a document and the master screen; and c) a comparing means operable for comparing the acquired moire intensity profile with a reference moire intensity profile, where at least one screen selected from the set comprising the basic screens and the master screen is an aperiodic screen.

38. The apparatus of claim 37, where the aperiodic screen is a geometrically transformed screen.

39. The apparatus of claim 37, where the image acquisition means and comparing means are human biosystems, a human eye and brain respectively.

40. The apparatus of claim 37, where the comparing means is a comparing processor controlling a document handling device accepting, respectively rejecting a document to be authenticated, according to the comparison operated by the comparing processor.

41. The apparatus of claim 40, where the comparing processor is a microcomputer comprising a processor, memory and input-output ports and where the image acquisition means is a camera connected to said microcomputer.

42. The apparatus of claim 37 where the master screen is a microlens structure.

43. A method for authenticating documents by using at least one moire intensity profile, the method comprising the steps of:

a) creating on a document at least one basic screen with at least one basic screen dot shape; and b) superposing a master screen with a master screen dot shape and the basic screen, thereby producing a moire intensity profile which is apparent to a human eye;

where at least one screen selected from the set comprising the basic screens and the master screen is an aperiodic screen.

44. The method of claim 43, where the aperiodic screen is a geometrically transformed screen.

45. The method of claim 43, where at least one screen selected from the set comprising the basic screens and the master screen is obtained by perforation.

46. The method of claim 43, where at least one screen selected from the set comprising the basic screens and the master screen is obtained by etching.

47. The method of claim 43, where at least one screen selected from the set comprising the basic screens and the master screen is a microlens structure.

48. A security device for authentication of documents comprising at least one basic screen with at least one basic screen dot shape, that is located on the document, where the document authentication is done by superposing a master screen with a master screen dot shape and a basic screen, thereby producing a moire intensity profile and permitting the comparison of said moire intensity profile with a reference moire intensity profile and the acceptance or the rejection of the document depending on the result of the comparison, and where the basic screen is a multichromatic basic screen whose individual elements are colored, thereby generating a color moire image when the master screen is superposed on said basic screen.

49. A security device for authentication of documents comprising at least one basic screen with at least one basic screen dot shape, that is located on the document, where the document authentication is done by superposing a master screen with a master screen dot shape and a basic screen, thereby producing a moire intensity profile and permitting the comparison of said moire intensity profile with a reference moire intensity profile and the acceptance or the rejection of the document depending on the result of the comparison, and where at least one screen selected from the set comprising the basic screens and the master screen includes dots whose shapes gradually vary according to their position, thereby generating in the screen superposition moire intensity profiles which vary in their shapes according to their position.

50. A security device for authentication of documents comprising at least one basic screen with at least one basic screen dot shape, that is located on the document, where the document authentication is done by superposing a master screen with a master screen dot shape and a basic screen, thereby producing a moire intensity profile and permitting the comparison of said moire intensity profile with a reference moire intensity profile and the acceptance or the rejection of the document depending on the result of the comparison, and where at least one screen selected from the set comprising the basic screens and the master screen includes dots whose colors gradually vary according to their position, thereby generating in the screen superposition moire intensity profiles which vary in their colors according to their position.

51. A security device for authentication of documents comprising at least one basic screen with at least one basic screen dot shape, that is located on the document, where the document authentication is done by superposing a master screen with a master screen dot shape and a basic screen, thereby producing a moire intensity profile and permitting the comparison of said moire intensity profile with a reference moire intensity profile and the acceptance or the rejection of the document depending on the result of the comparison, and where at least one screen selected from the set comprising the basic screens and the master screen includes dots of gradually varying shapes and is incorporated within a variable intensity halftoned image.

52. The security device of claim 51, where at least one screen is a color halftoned image.

53. A security device for authentication of documents comprising at least one basic screen with at least one basic screen dot shape, that is located on the document, where the document authentication is done by superposing a master screen with a master screen dot shape and a basic screen, thereby producing a moire intensity profile and permitting the comparison of said moire intensity profile with a reference moire intensity profile and the acceptance or the rejection of the document depending on the result of the comparison, and where at least one screen selected from the set comprising the basic screens and the master screen is an aperiodic screen.

54. A security device for authentication of documents comprising at least one basic screen with at least one basic screen dot shape, that is located on the document, where the document authentication is done by superposing a master screen with a master screen dot shape and a basic screen, thereby producing a moire intensity profile and permitting the comparison of said moire intensity profile with a reference moire intensity profile and the acceptance or the rejection of the document depending on the result of the comparison, and where at least one screen selected from the set comprising the basic screens and the master screen is obtained by perforation.

55. A security device for authentication of documents comprising at least one basic screen with at least one basic screen dot shape, that is located on the document, where the document authentication is done by superposing a master screen with a master screen dot shape and a basic screen, thereby producing a moire intensity profile and permitting the comparison of said moire intensity profile with a reference moire intensity profile and the acceptance or the rejection of the document depending on the result of the comparison, and where at least one screen selected from the set comprising the basic screens and the master screen is obtained by etching.

56. A security device for authentication of documents comprising at least one basic screen with at least one basic screen dot shape, that is located on the document, where the document authentication is done by superposing a master screen with a master screen dot shape and a basic screen, thereby producing a moire intensity profile and permitting the comparison of said moire intensity profile with a reference moire intensity profile and the acceptance or the rejection of the document depending on the result of the comparison, and where the document is a valuable product.

57. A security device for authentication of documents comprising at least one basic screen with at least one basic screen dot shape, that is located on the document, where the document authentication is done by superposing a master screen with a master screen dot shape and a basic screen, thereby producing a moire intensity profile and permitting the comparison of said moire intensity profile with a reference moire intensity profile and the acceptance or the rejection of the document depending on the result of the comparison, and where the document is a package of a valuable product.

58. A security device for authentication of documents comprising at least one basic screen with at least one basic screen dot shape, that is located on the document, where the document authentication is done by superposing a master screen with a master screen dot shape and a basic screen, thereby producing a moire intensity profile and permitting the comparison of said moire intensity profile with a reference moire intensity profile and the acceptance or the rejection of the document depending on the result of the comparison, and where the document is affixed to a valuable product.

59. A security device for authentication of documents comprising at least one basic screen with at least one basic screen dot shape, that is located on the document, where the document authentication is done by superposing a master screen with a master screen dot shape and a basic screen, thereby producing a moire intensity profile and permitting the comparison of said moire intensity profile with a reference moire intensity profile and the acceptance or the rejection of the document depending on the result of the comparison, and where at least one screen selected from the set comprising the basic screens and the master screen is located on a valuable product, and where at least one other screen selected from the same set is located on the valuable product's package.

60. A security document protected by a security device, said security device comprising at least one basic screen with at least one basic screen dot shape, that is located on the document, where the document authentication is done by superposing a master screen with a master screen dot shape and a basic screen, thereby producing a moire intensity profile and permitting the comparison of said moire intensity profile with a reference moire intensity profile and the acceptance or the rejection of the document depending on the result of the comparison, where said security document is an optical disk.

61. A security document protected by a security device, said security device comprising at least one basic screen with at least one basic screen dot shape, that is located on the document, where the document authentication is done by superposing a master screen with a master screen dot shape and a basic screen, thereby producing a moire intensity profile and permitting the comparison of said moire intensity profile with a reference moire intensity profile and the acceptance or the refection of the document depending on the result of the comparison, where said security document is a package of a valuable product.

62. A security device for authentication of documents comprising at least one basic screen with at least one basic screen dot shape, that is located on the document, where the document authentication is done by superposing a master screen with a master screen dot shape and a basic screen, thereby producing a moire intensity profile and permitting the comparison of said moire intensity profile with a reference moire intensity profile and the acceptance or the rejection of the document depending on the result of the comparison, and where the basic screen is created by an embossing process and the master screen is selected from the set comprising pinhole screens, screens containing tiny dots and microlens structures.

* * * * *